US012798713B2

(12) United States Patent
Hu et al.

(10) Patent No.: US 12,798,713 B2
(45) Date of Patent: Nov. 17, 2026

(54) MANUFACTURING METHOD, PRODUCT OF BICYCLE FRAME UNIT AND PRESTRUCTURE OF BICYCLE FRAME ADAPTABLE FOR DIFFERENT MOTOR SYSTEMS

(71) Applicant: Astro Tech Co., Ltd., Changhua County (TW)

(72) Inventors: Samuel Hu, Changhua County (TW); Liu-Cheng Liu, Changhua County (TW); Chia-Wei Hu, Changhua County (TW)

(73) Assignee: ASTRO TECH CO., LTD., Changhua County (TW)

( * ) Notice: Subject to any disclaimer, the term of this patent is extended or adjusted under 35 U.S.C. 154(b) by 685 days.

(21) Appl. No.: 18/096,574

(22) Filed: Jan. 13, 2023

(65) Prior Publication Data

US 2023/0242205 A1 Aug. 3, 2023

Related U.S. Application Data

(60) Provisional application No. 63/418,651, filed on Oct. 24, 2022.

(30) Foreign Application Priority Data

Jan. 28, 2022 (TW) ................................ 111104065

(51) Int. Cl.

*B62K 11/02* (2006.01)
*B21D 53/86* (2006.01)
*B62K 19/08* (2006.01)

(52) U.S. Cl.

CPC .............. *B62K 11/02* (2013.01); *B21D 53/86* (2013.01); *B62K 19/08* (2013.01)

(58) Field of Classification Search

CPC ..... B62K 19/08; B62K 19/20; B23K 37/0531
See application file for complete search history.

(56) References Cited

U.S. PATENT DOCUMENTS 2,729,466 A * 1/1956 Giordani ................ B62K 19/08 280/281.1
3,261,529 A * 7/1966 Pagan .................... B23K 9/035 219/160

(Continued)

FOREIGN PATENT DOCUMENTS

CN 107776823 3/2018
CN 208696680 4/2019

(Continued)

OTHER PUBLICATIONS

CN112278135A translation (Year: 2021).*

(Continued)

*Primary Examiner* — Michael W Hotchkiss
(74) *Attorney, Agent, or Firm* — WPAT, PC

(57) ABSTRACT

A manufacturing method of a bicycle unit has the following steps. In a pressing step: press metal sheets to form casing parts being overlappable. In an abutting step: abut the casing parts to form an abutting line. In a connecting step: connecting the two casing parts along the abutting line to form a motor mount prestructure having side plates and a motor-installation space formed therebetween. A prestructure of a (Continued)

bicycle frame is thereby made. In a motor mount forming step: cut the two side plates of the motor mount prestructure in compliance with a pre-determined motor system so as to form a bicycle frame unit with a motor mount.

12 Claims, 26 Drawing Sheets

(56) References Cited

U.S. PATENT DOCUMENTS

| | | | | | |
|---|---|---|---|---|---|
| 4,465,220 | A * | 8/1984 | Ledlow | B23K 9/035 279/2.08 |
| 4,792,374 | A * | 12/1988 | Rianda | B23K 37/003 156/503 |
| 5,323,950 | A * | 6/1994 | Mamon | B23K 37/0531 219/160 |
| 5,853,651 | A | 12/1998 | Lindsay et al. | |
| 11,603,163 | B2 * | 3/2023 | Wang | B62M 6/55 |
| 2008/0029578 | A1 * | 2/2008 | Steel | B23K 37/0531 228/2.1 |
| 2015/0048587 | A1 * | 2/2015 | Choi | B62K 19/20 280/288.3 |
| 2017/0016526 | A1 | 1/2017 | Watarai et al. | |
| 2018/0065705 | A1 * | 3/2018 | Choi | B62K 19/08 |
| 2018/0346054 | A1 | 12/2018 | Choi et al. | |
| 2019/0376778 | A1 | 12/2019 | Choi | |
| 2019/0382073 | A1 * | 12/2019 | Hurwitz | B62K 21/12 |
| 2019/0389528 | A1 * | 12/2019 | Buzov | B62K 3/02 |
| 2021/0331763 | A1 | 10/2021 | Northfield | |
| 2021/0354774 | A1 * | 11/2021 | Kugele | B62J 1/08 |

FOREIGN PATENT DOCUMENTS

| | | | | | |
|---|---|---|---|---|---|
| CN | 112278135 | A * | 1/2021 | B62K 19/06 |
| CN | 212529953 | U * | 2/2021 | B62M 7/02 |
| CN | 113165717 | | 7/2021 | |
| CN | 213892777 | U * | 8/2021 | |
| DE | 202012103684 | U1 * | 11/2012 | B62K 19/34 |
| DE | 102012004174 | | 9/2013 | |
| DE | 202018106843 | U1 * | 3/2019 | B62K 19/30 |
| EP | 1366975 | B1 * | 11/2007 | B62K 11/08 |
| EP | 3521153 | A1 * | 8/2019 | B21D 53/86 |
| EP | 3904192 | | 11/2021 | |
| TW | 201416287 | | 5/2014 | |
| TW | M566687 | | 9/2018 | |
| TW | M576098 | | 4/2019 | |
| TW | 201934413 | | 9/2019 | |
| TW | M593361 | | 4/2020 | |

OTHER PUBLICATIONS

DE202018106843U1 translation (Year: 2019).*
CN213892777U translation (Year: 2021).*
CN-212529953-U translation (Year: 2021).*
DE-202012103684-U1 translation (Year: 2012).*

* cited by examiner

MANUFACTURING METHOD, PRODUCT OF BICYCLE FRAME UNIT AND PRESTRUCTURE OF BICYCLE FRAME ADAPTABLE FOR DIFFERENT MOTOR SYSTEMS

CROSS-REFERENCE TO RELATED APPLICATION

The present application is a non-provisional application claiming the benefits of U.S. provisional application No. 63/418,651, filed on Oct. 24, 2022 and Taiwan Patent Application No. 111104065, filed on Jan. 28, 2022, which are hereby specifically incorporated herein by this reference thereto.

BACKGROUND OF THE INVENTION

1. Field of the Invention

The present invention is a metal bicycle frame unit and a manufacturing method of a bicycle frame unit. More particularly, this application discloses a manufacturing method involves making a prestructure of an electric bicycle frame adapted for different motor systems.

2. Description of Related Art

An e-bike powered with a motor facilitates a user to enjoy easy and comfortable riding experience. Thereby the conventional e-bike is more and more popular. While more powerful e-bikes are created, more do the motors take a significant weight proportion over the whole bike; therefore a position and an angle at which the motor is placed on a bicycle frame of the conventional e-bike makes a huge impact on a center of gravity of the conventional e-bike.

Generally, the bicycle frame of the conventional e-bike has a motor mount for receiving the motor, and the motor mount is designed and manufactured according to a predetermined motor system. The motor mount is made in one-piece, e.g. by casting or forging, independently or along with other components of the bicycle frame. In other words, in the conventional process of making a bicycle frame unit, the motor mount is specifically created for each individual motor system.

However, motor systems made by different manufacturers have different shapes and sizes, so different motor systems have different fixing points when attached to the bicycle frame. Therefore, the motor mount of the conventional e-bike cannot be fit for all kinds of motor systems.

Based on the foregoing descriptions, the bicycle frame of the conventional e-bike (having the motor mount) is specifically made for varieties of systems. Costs for developing molds and costs for storage due to slow inventory consumption are therefore high.

Moreover, EP 3294616 B1 discloses a bicycle frame comprising a receiving device for a drive housing. By inserting a detachable adaptor as a relay between the motor mount and a corresponding motor system, the bicycle frame is adapted for different motor systems by making different types of adaptors therefor. However, with the adaptor between the motor mount and the corresponding motor system, the motor system may not be attached to a location best fitted for the center of gravity of the conventional e-bike. Still, making different types of adaptors takes the costs for molds and storage as well.

To overcome the shortcomings, the present invention provides a manufacturing method and a product of bicycle frame unit and a prestructure of a bicycle frame adaptable for different motor systems to solve the aforementioned problems.

SUMMARY OF THE INVENTION

The main objective of the present invention is to provide a manufacturing method to make a prestructure of a bicycle frame and by such cost-efficient manufacturing method to create accommodating mechanism with a receiving housing adaptable for different motor systems.

The manufacturing method comprises a pressing step, an abutting step, a connecting step, and a motor mount forming step. In the pressing step, press one or more metal sheets to form two casing parts that are overlappable, wherein each one of the two casing parts has a motor mount segment and a connecting edge, the motor mount segment has a side plate, and the connecting edge matches with the connecting edge of the other casing part. In the abutting step, abut the connecting edges of the two casing parts to form an abutting line. In the connecting step, connect the two casing parts along the abutting line such that the motor mount segments of the two casing parts are connected and form a motor mount prestructure being suitable for multiple types of motor systems, and having the two side plates of the motor mount segments, a front portion, a top portion connected with the front portion and between the two side plates, and a motor-installation space formed between the two side plates and the top portion of the motor mount prestructure, wherein the two side plates are flat, each one of the two side plates has a bottom edge, and the bottom edge is located below a reference axis. In the motor mount forming step, after a specific motor system is determined, cut the two side plates of the motor mount prestructure and form cut edges in compliance with the specific motor system so as to form a bicycle frame unit with a motor mount. The cut edges are located above the reference axis. A transmission shaft of the specific motor system is substantially along the reference axis when the specific motor system is mounted with the motor mount.

The present invention further provides a bicycle frame unit made by the aforementioned manufacturing method. The motor mount of the bicycle frame unit has a cut edge formed on two sides of the motor mount. The bicycle frame unit has a reference axis adapted to locate a transmission shaft therealong and below the cut edge.

The present invention further provides a prestructure of a bicycle frame adaptable for different motor systems, and the prestructure is configured to form a bicycle frame unit after processing and comprises a motor mount prestructure and a reference axis. The motor mount comprises a front portion, at least one side plate, a top portion connected with the front portion and said side plate, and a motor-installation space formed between said side plate and the top portion of the motor mount prestructure. The reference axis perpendicularly passes through the two side plates and is adapted to locate a transmission shaft therealong. A circle defined by an origin on the reference axis as a center and a distance between the reference axis and the front portion of the motor mount prestructure as a radius encompasses said side plate. The two side plates are configured to be cut to accommodate and be adapted to a motor system and to form at least one mounting point for mounting the motor system.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
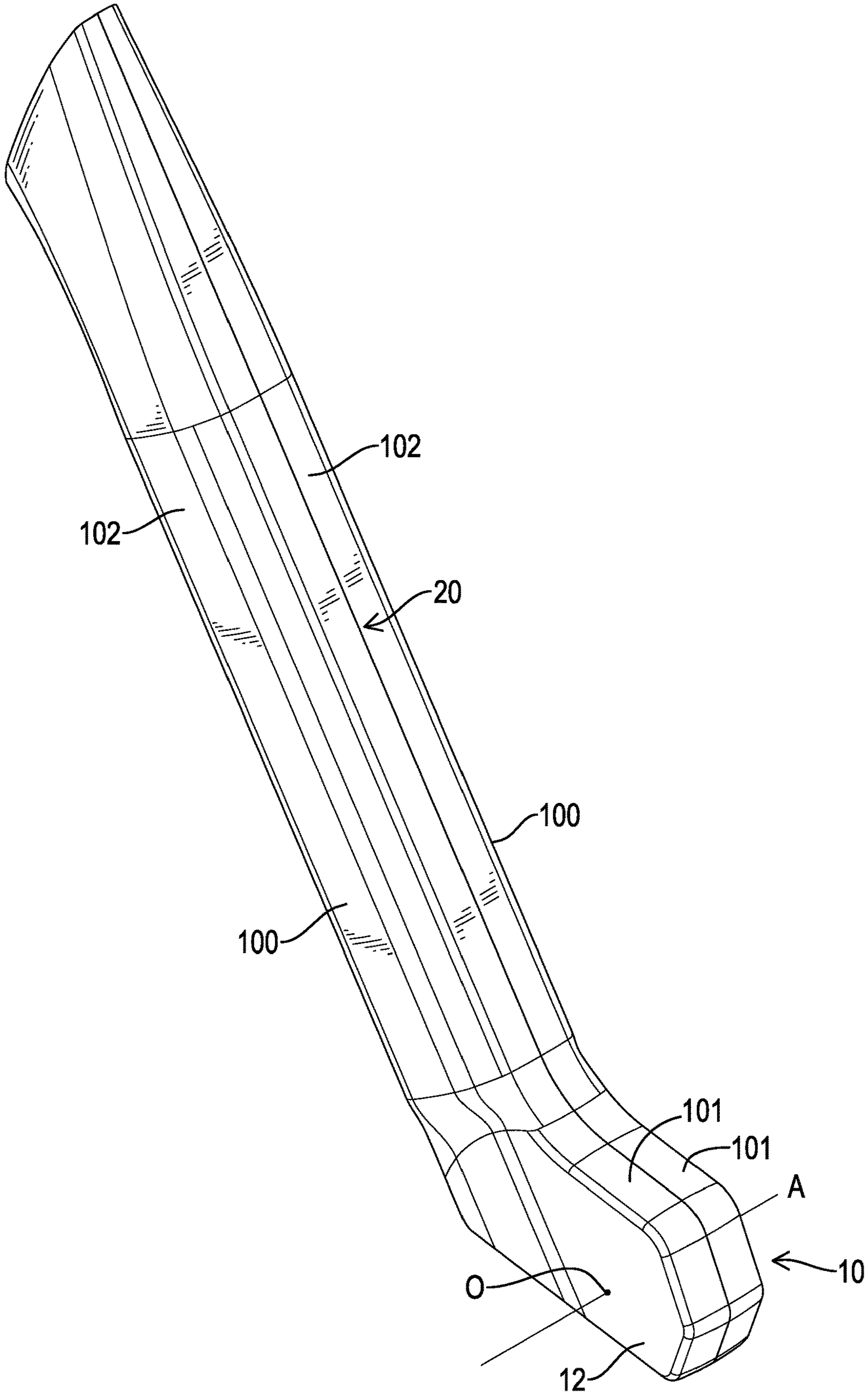
FIG. 1 is a perspective view of a preferred embodiment of a prestructure of a bicycle frame in accordance with the present invention.

With reference to FIGS. 1 to 4, a prestructure of a bicycle frame in accordance with the present invention comprises two casing parts 100, and the casing parts 100 are made of metal, and are connected to each other to form a frame structure. With reference to FIG. 1, the frame structure comprises a motor mount prestructure 10 and a downtube portion 20 connected therewith. The motor mount prestructure 10 is formed as a motor mount of a bicycle frame unit after processing, for fitting a corresponding motor system.

Figure 2:
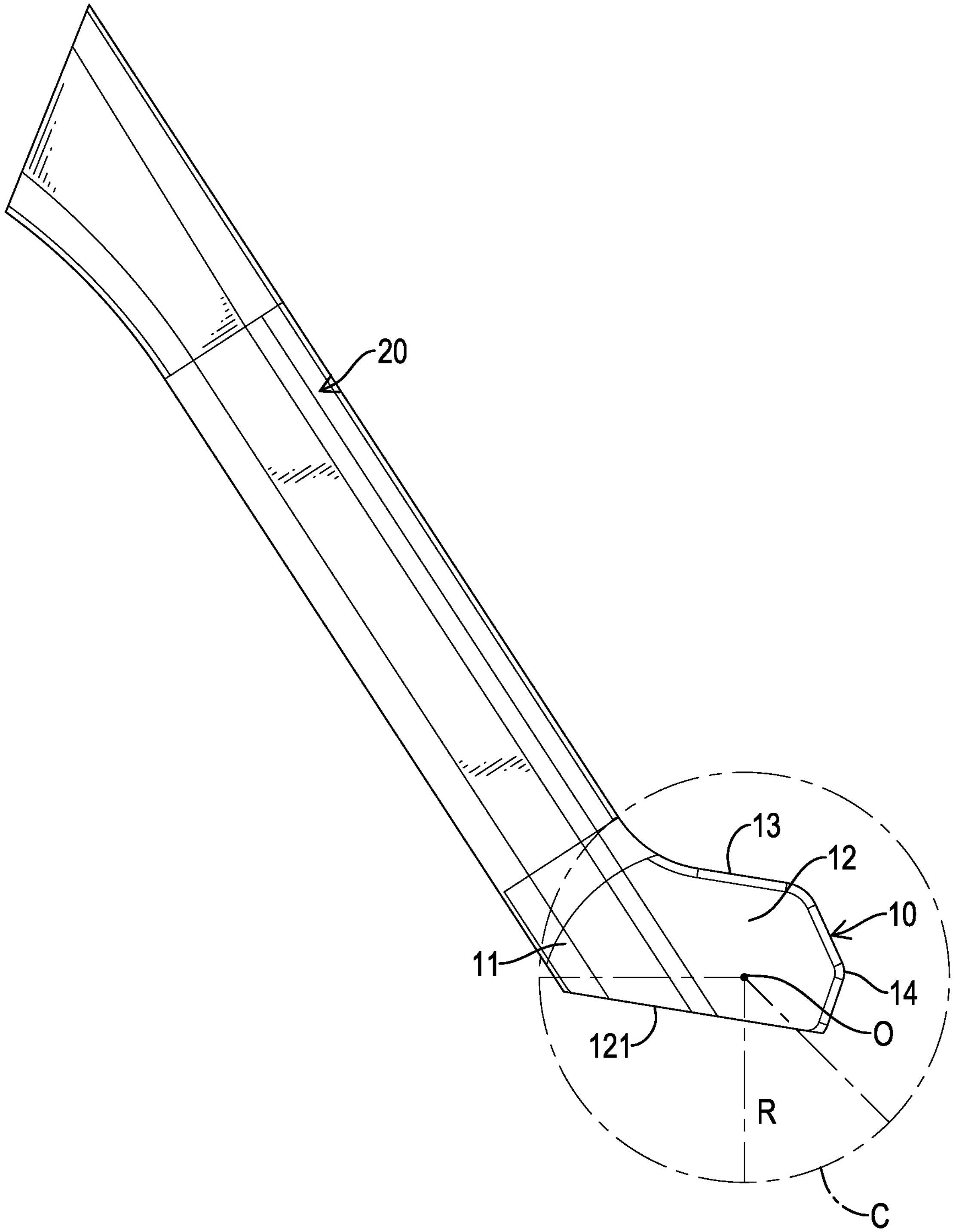
FIG. 2 is a side view of the prestructure of a bicycle frame in FIG. 1.
Figure 3:
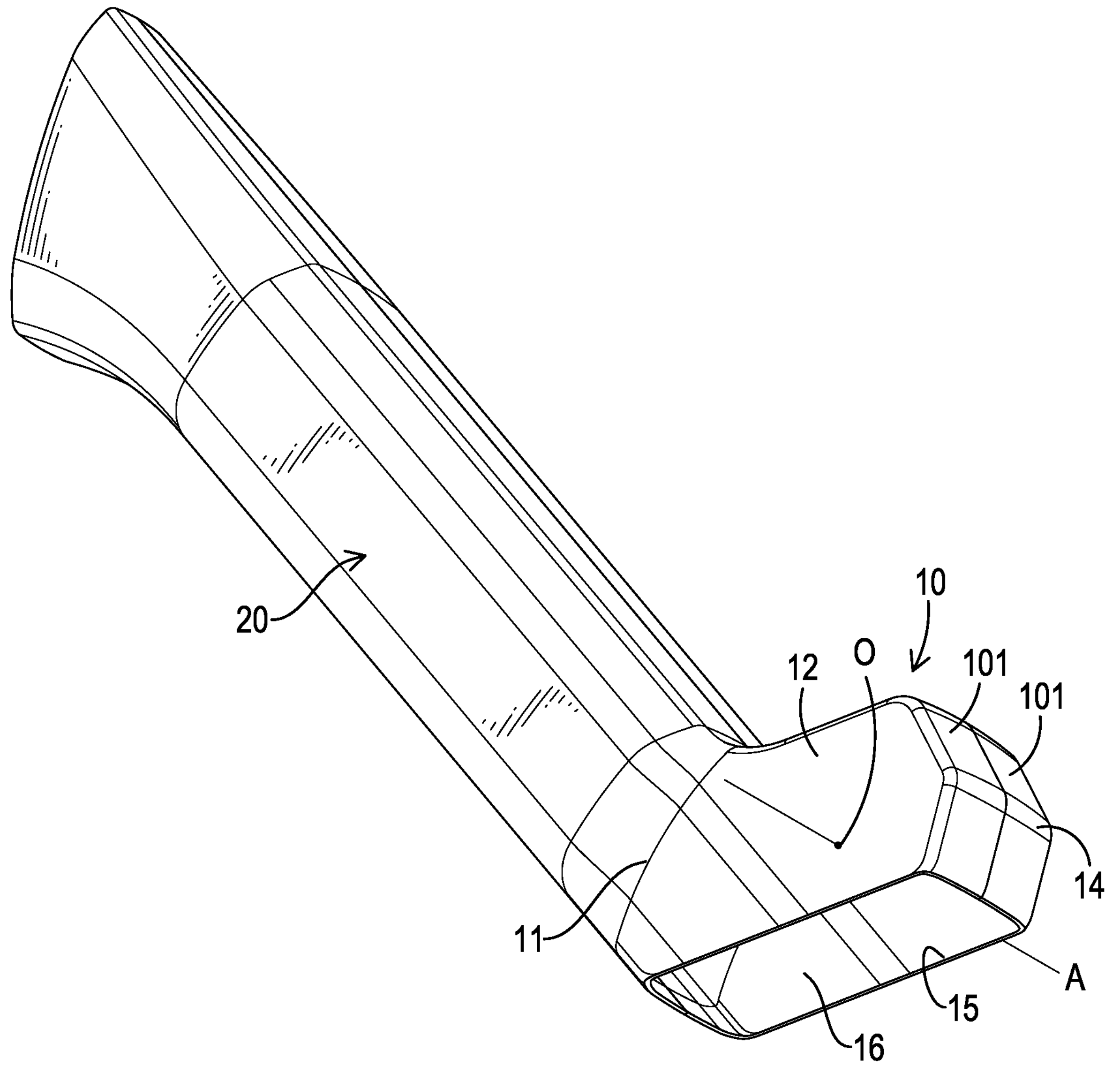
FIG. 3 is another perspective view of the prestructure of a bicycle frame in FIG. 1.

Designing a bicycle frame starts with an origin, which is known as the center of a bottom bracket of the bicycle frame to be designed. For a bicycle frame of an e-bike, the center of the bottom bracket is defined by a driving axis of a motor system. With reference to FIGS. 1 to 3, the motor mount prestructure has an origin O and a reference axis A. The reference axis A is adapted to locate a transmission shaft of an e-bike therealong, and passes the origin O. The prestructure of a bicycle frame is designed from the origin O.

Each of the two casing parts 100 is one-piece formed, and has a motor mount segment 101 and a downtube segment 102 connected to each other. Specifically, the motor mount prestructure 10 is formed by connecting the motor mount segments 101 of the two casing parts 100, and the downtube portion 20 is formed by connecting the downtube segments 102 of the two casing parts 100.

With reference to FIGS. 2 and 3, the motor mount prestructure 10 has a front portion 11, two side plates 12, a top portion 13, a rear portion 14, an opening 15, and a motor-installation space 16. The front portion 11 is formed on a side of the motor mount prestructure 10 and is oriented to a front side of a bicycle frame after the prestructure of a bicycle is further processed. Each of the two side plates 12 is formed on the motor mount segment 101 of a respective one of the two casing parts 100 and is formed flat. The reference axis A perpendicularly passes through the two side plates 12, so an area of the two side plates covers the origin O. In the preferred embodiment of the present invention, each one of the side plates 12 has a bottom edge 121 being linear and located below the origin O.

The top portion 13 is connected between the front portion 11 and the rear portion 14 and between the two side plates 12. The front portion 11, the top portion 13, and the rear portion 14 are formed through connecting the motor mount segments 101 of the two casing parts 100.

With reference to FIG. 3, the opening 15 is formed on a bottom of the motor mount prestructure 10 between the two side plates 12, and the motor-installation space 16 is formed between the two side plates 12 and the top portion 13 inside the opening 15 for receiving a motor system. That is, the motor mount prestructure 10 is formed as an inverted U-shaped configuration.

With reference to FIG. 2, from a side view of the prestructure of a bicycle frame, the motor mount prestructure 10 is in a circle C range with the origin O as a center and a distance between the reference axis A and the front portion 11 of the motor mount prestructure 10 as a radius R. Specifically, with reference to FIG. 2, the circle C encompasses the two side plates 12, and the rear portion 14 is located between the circle C and the origin O. In a preferred embodiment of the present invention, the radius R is around 160 millimeters.

Figure 4:
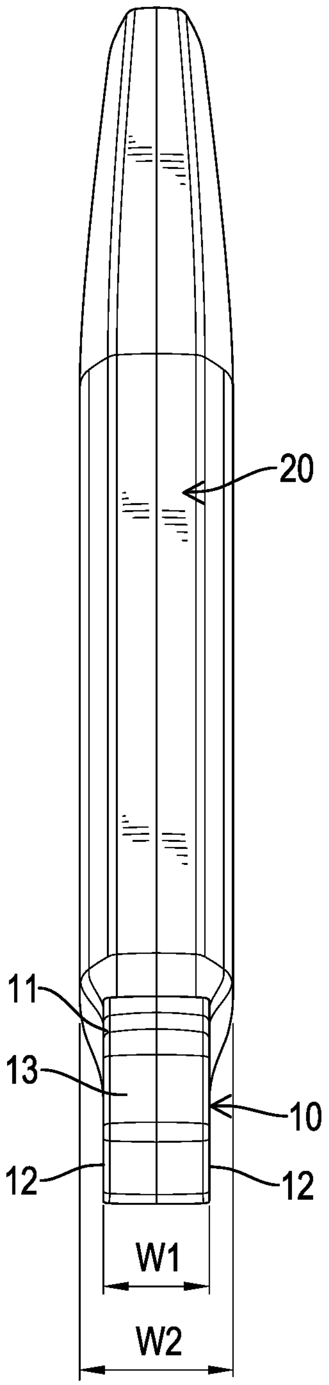
FIG. 4 is a rear side view of the prestructure of a bicycle frame in FIG. 1.

With reference to FIGS. 1 to 4, the downtube portion 20 is connected with the front portion 11 of the motor mount prestructure 10 and obliquely extends forward and upward. With reference to FIG. 4, in order to avoid interference of a rider's cycling, a first width W1 defined as a width of the motor mount prestructure 10 is smaller than or, at most, equal to a second width W2 defined as a width of the downtube portion 20. Preferably, with reference to FIG. 3, the first width W1 is smaller than the second width W2. The first width W1 falls within a range of 40 to 80 millimeters, including end points.

Figure 5:
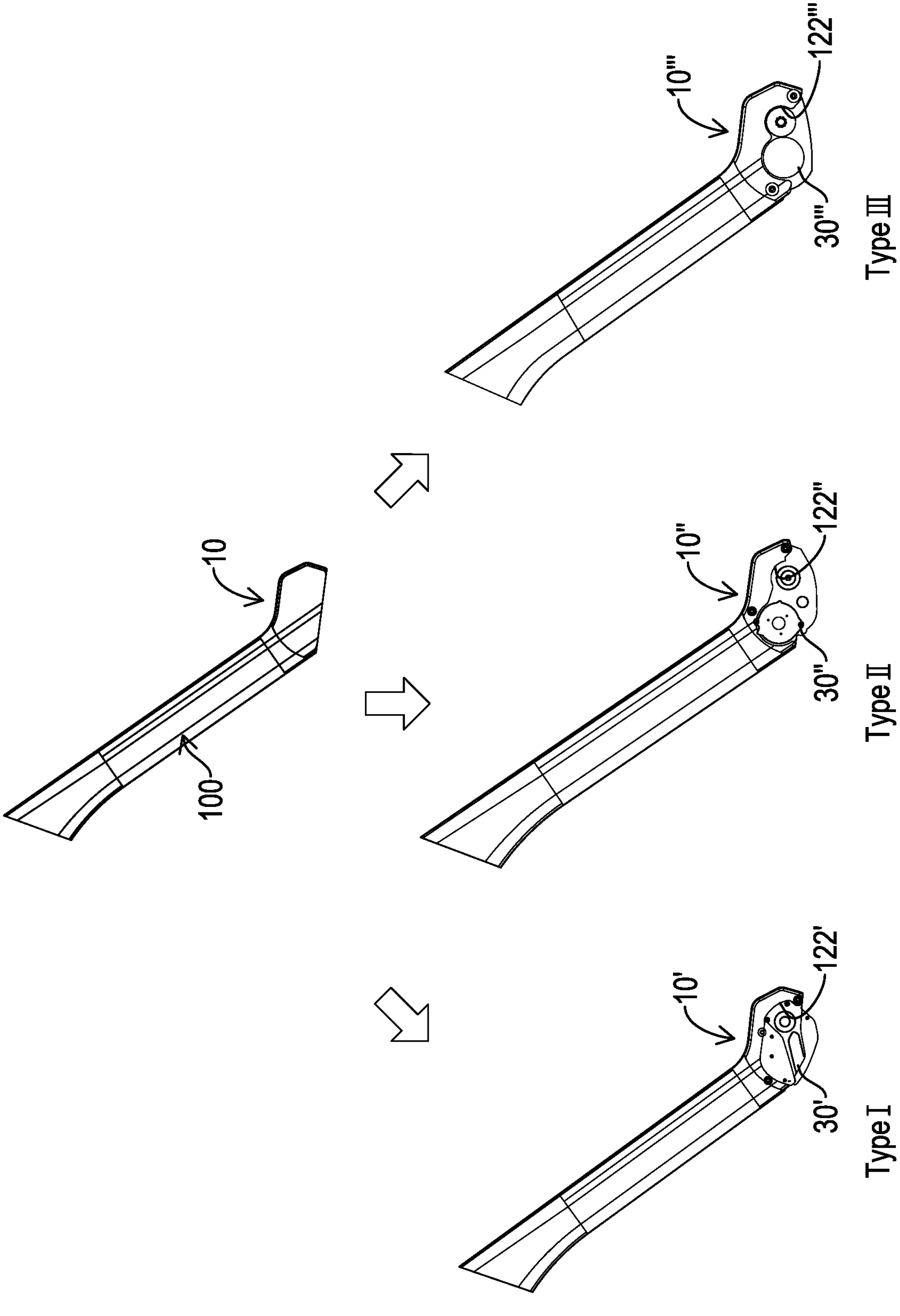
FIG. 5 illustrates examples of products made from the prestructure of a bicycle frame in FIG. 1 after processing.

With aforementioned technical features, with reference to FIG. 5, when using the prestructure of a bicycle frame to make a bicycle frame unit, a manufacturer may cut and bore the two side plates 12 in compliance with a specific motor system 30', 30'', 30''' and form cut edges 122', 122'', 122''' and a plurality of mounting points on the predetermined positions of sides plates 12, and a bicycle frame unit with a motor mount 10', 10'', 10''' is formed. Said specific motor system 30', 30'', 30''' can fit with cut edges 122', 122'', 122''' of the motor mount 10', 10'', 10''', and can be fixed to the motor mount 10', 10'', 10''' with bolts through the mounting points. The bicycle frame unit described in the present invention may refer to either a part or an integral of the bicycle frame of an e-bike.

For instance, with reference to FIG. 5, after processing according to different motor systems, the motor mount prestructure 10 is suitable for a Type I motor system 30', a Type II motor system 30'', or a Type III motor system 30'''. The motor systems 30', 30'', 30''' shown in FIG. 5 are provided by well-known motor makers such as Shimano, Yamaha, and Bosch for exemplary purposes. The motor mount prestructure 10 is suitable for other types of motor systems after processing as motor systems 30', 30'', 30''' for e-bikes that have specific standards to meet.

Although in the preferred embodiment of the present invention as shown in FIGS. 1 to 4, the prestructure of a bicycle frame has the motor mount prestructure 10 and the downtube portion 20 formed in one-piece, the prestructure of a bicycle frame in accordance with the present invention may only comprise the motor mount prestructure 10 or may further comprise other portions of a bicycle frame, such as a head tube portion, as long as the prestructure of a bicycle frame has the motor mount prestructure 10 having technical features described in the previous paragraphs and adapted for different motor systems. Other parts of a bicycle frame can be connected to the bicycle frame unit afterwards.

Figure 6:
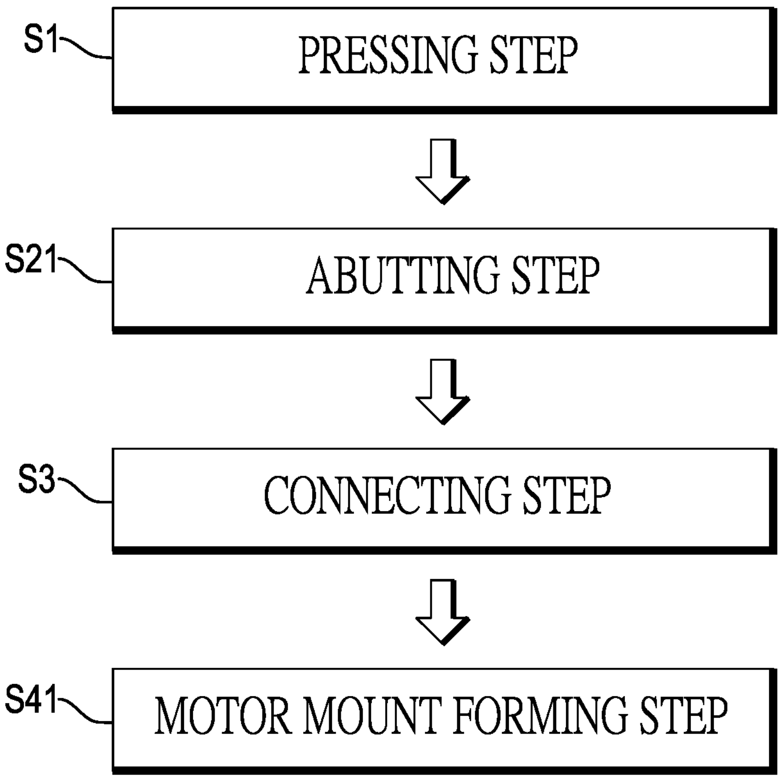
FIG. 6 is a flow chart of a first embodiment of a manufacturing method of a bicycle frame unit in accordance with the present invention.

With reference to FIG. 6, a first embodiment of a manufacturing method of a bicycle frame unit in accordance with the present invention is provided, which at least comprises a pressing step S2, an abutting step S21, a connecting step S3, and a motor mount forming step S41.

In the pressing step S1: with reference to FIG. 7, press two metal sheets to form two casing parts 100 that are suitable to form a rigid unit later. Each of the two casing parts 100 has a motor mount segment 101, a downtube segment 102 connected to the motor mount segment 101 in one-piece, and connecting edges 103 extending from the motor mount segment 101 to the downtube segment 102. The motor mount segment 101 has a side plate 12, and the connecting edges 103 match with the connecting edges 103 of the other casing part 100. The connecting edges 103 of the two casing parts 100 contact each other and are overlapped so that the two casing parts 100 can be connected. Preferably, said metal sheets can be chosen from aluminum alloy and aluminum-magnesium alloy. Furthermore, the two casing parts 100 are preferably symmetric to each other.

Figure 7:
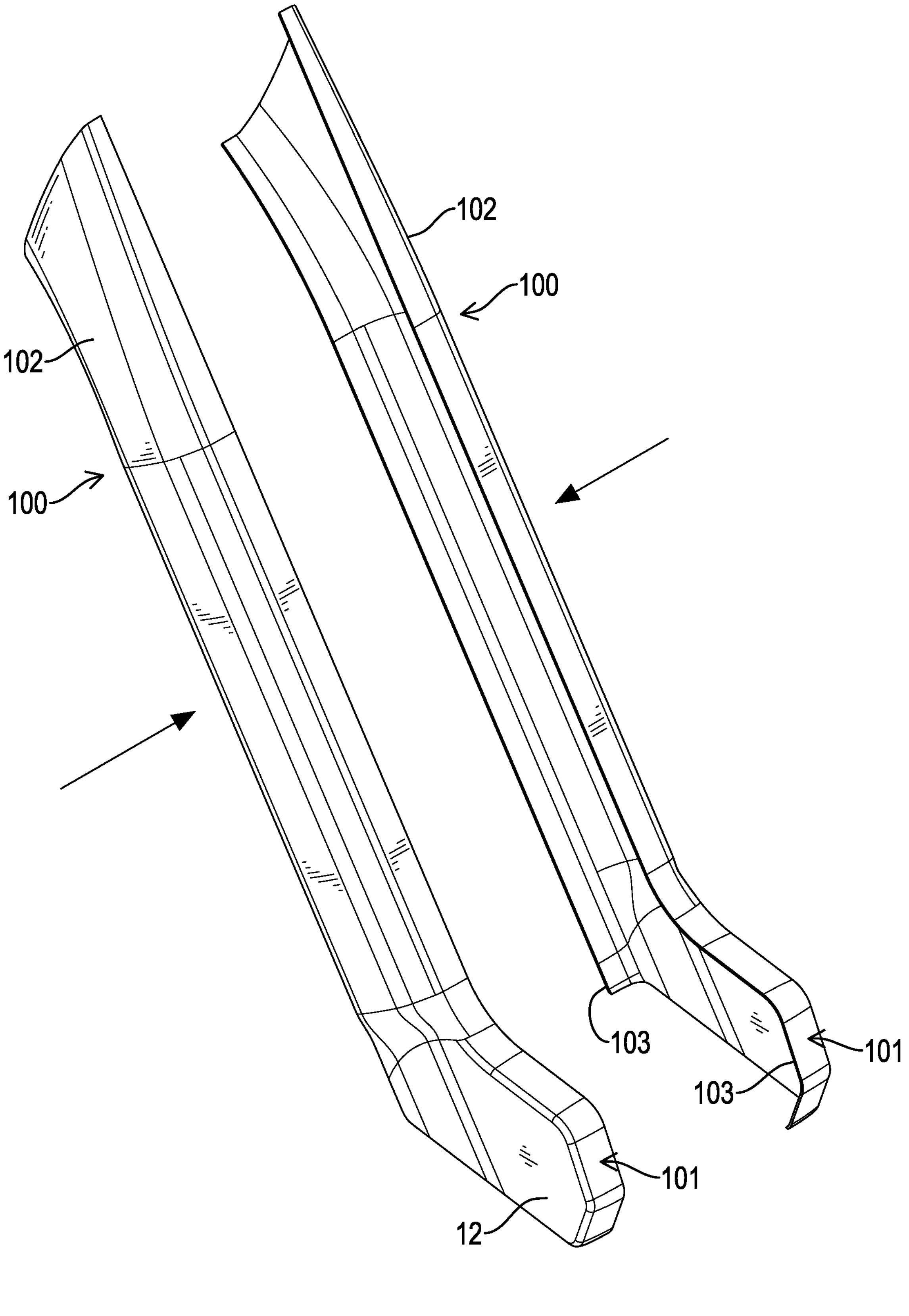
FIGS. 7 and 8 show a pressing step and an abutting step of the manufacturing method in FIG. 6.
Figure 8:
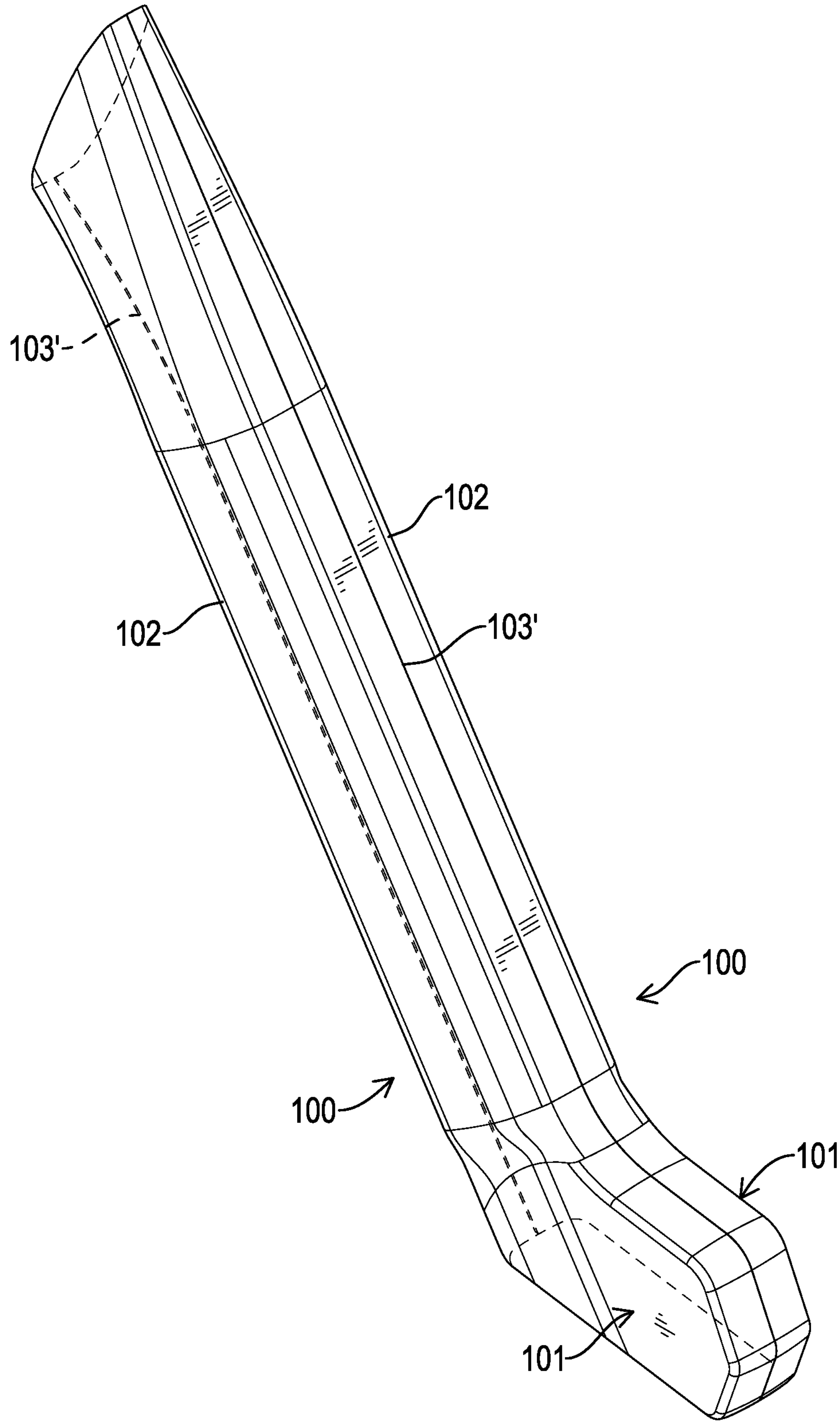

In the abutting step S21: with reference to FIGS. 7 and 8, abut the connecting edges 103 of the two casing parts 100 and forming abutting lines 103'.

In the connecting step S3: with reference to FIGS. 1, 2, 3, and 8 connect the two casing parts 100 along the abutting lines 103' such that the motor mount segments 101 of the two casing parts 100 are connected to form a motor mount prestructure 10 having the side plates 12, a front portion 11, a top portion 13 connected with the front portion 11 and between the two side plates 12, and a motor-installation space 16 formed between the two side plates 12 and the top portion 13, and connecting the downtube segments 102 of the two casing parts 100 as a downtube portion 20 which is connected with the front portion 11 of the motor mount prestructure 10. After the connecting step S3, the two casing parts 100 have become the prestructure of a bicycle frame described in the previous paragraphs.

Specifically, connecting the two casing parts 100 may adopt various connecting techniques such as gluing, riveting, screwing, welding with fillers, filler-free welding, etc., as long as the two casing parts 100 can be fixed together to form a rigid body suitable for heavy riding.

In the motor mount forming step S41: with reference to FIGS. 1, 2, 3, and 5, cutting the two side plates 12 of the motor mount prestructure 10 in compliance with a predetermined motor system 30', 30'', 30''' so as to form a bicycle frame unit with a motor mount 10', 10'', 10'''. Specifically, either one of CNC cutting and laser cutting is applicable for cutting and boring the side plates 12.

With aforementioned steps, the two casing parts 100 are made through pressing, and the side plates 12 are cut by CNC cutting or laser cutting after the corresponding motor system is determined. Thereby, the two casing parts 100 are relatively thin and light in weight in comparison with the bicycle frame made by casting or forging. Material consumption is reduced and the products are lighter, improving utility of bicycle frame units of e-bikes.

Furthermore, since side plates 12 formed on the casing parts 100 are thin, the process of CNC cutting or laser cutting may be finished in a short period. The process is even faster when applying laser cutting for the motor mount forming step S41, because when laser cutting is completed, no trimming and polishing are needed. Quality of products by laser cutting is also better.

Moreover, by the manufacturing method the prestructure of a bicycle frame can be made as a standard component to be further adapted for different motor systems. When prestructures of bicycle frames are produced, the prestructures can be processed into bicycle frame units for different motor systems, instead of a high risk of piling up in storehouses. Therefore, the manufacturing method provides efficacy of low inventory, instant manufacture, and therefore low manufacturing costs.

Preferably, in the preferred embodiment of the present invention, the downtube portion 20 and the motor mount prestructure 10 are formed in one-piece, so the products of bicycle frame units are precise in shapes and sizes and have good structural strengths. Optionally, in the pressing step S1, the casing parts 100 may only comprise the motor mount segment 101, and other tubes of a bicycle frame may be connected thereto later.

Furthermore, throughout the foregoing paragraphs, the prestructure of the bicycle frame comprising the two casing parts 100 can be produced while the corresponding motor systems have not been determined. Alternatively, a producer can store the casing parts 100 wherein each has the side plate 12. Once the corresponding motor system is decided, cut the side plate 12 of each casing part 100 first; then connect the two casing parts 100 to form the product of the motor mount. In this case, the two casing parts 100 are motor mount prestructures. In brief, the connecting step S3 and the motor mount forming step S41 are interchangeable.

Figure 9:
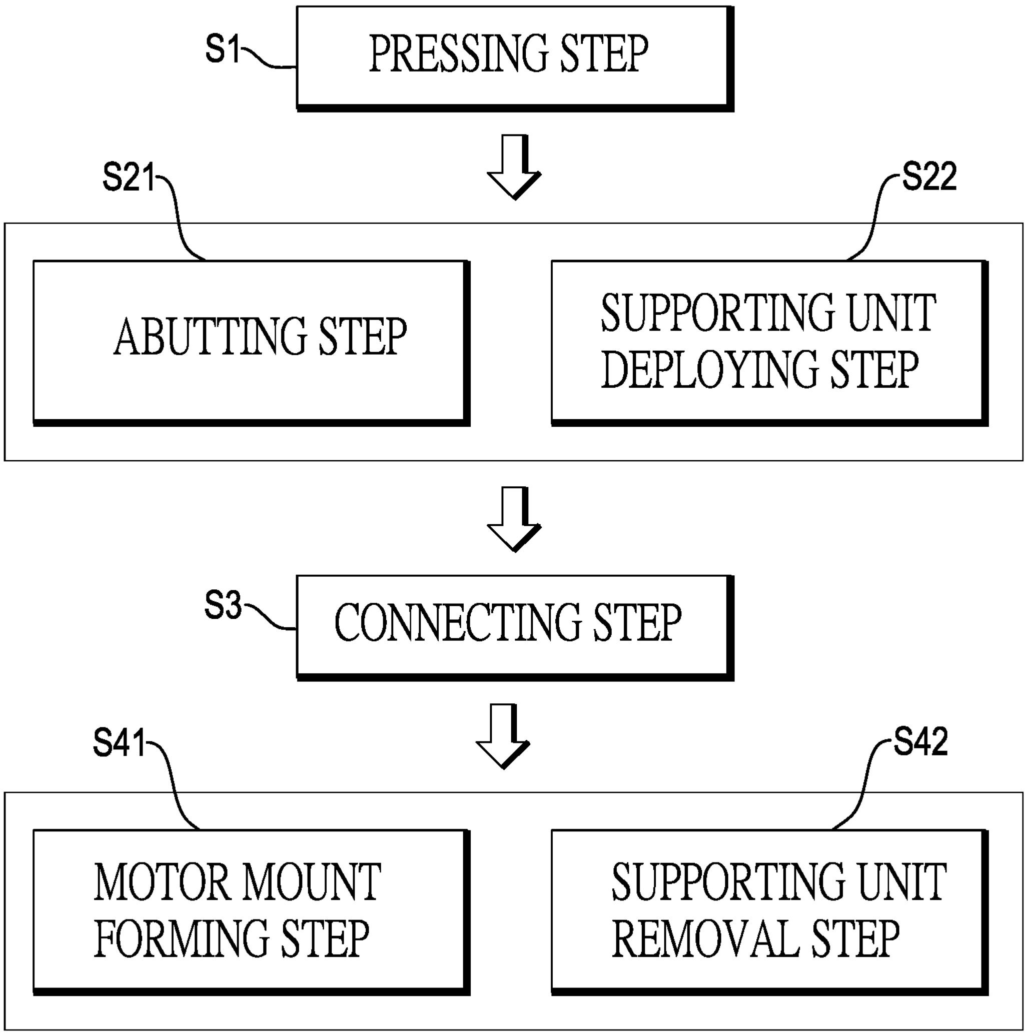
FIG. 9 is a flow chart of a second embodiment of a manufacturing method of a bicycle frame unit in accordance with the present invention.

With reference to FIG. 9, a second embodiment of a manufacturing method of a bicycle frame unit in accordance with the present invention is provided. Compared with the first embodiment, the second embodiment further comprises a supporting unit deploying step S22 and a supporting unit removal step S42.

Figure 10:
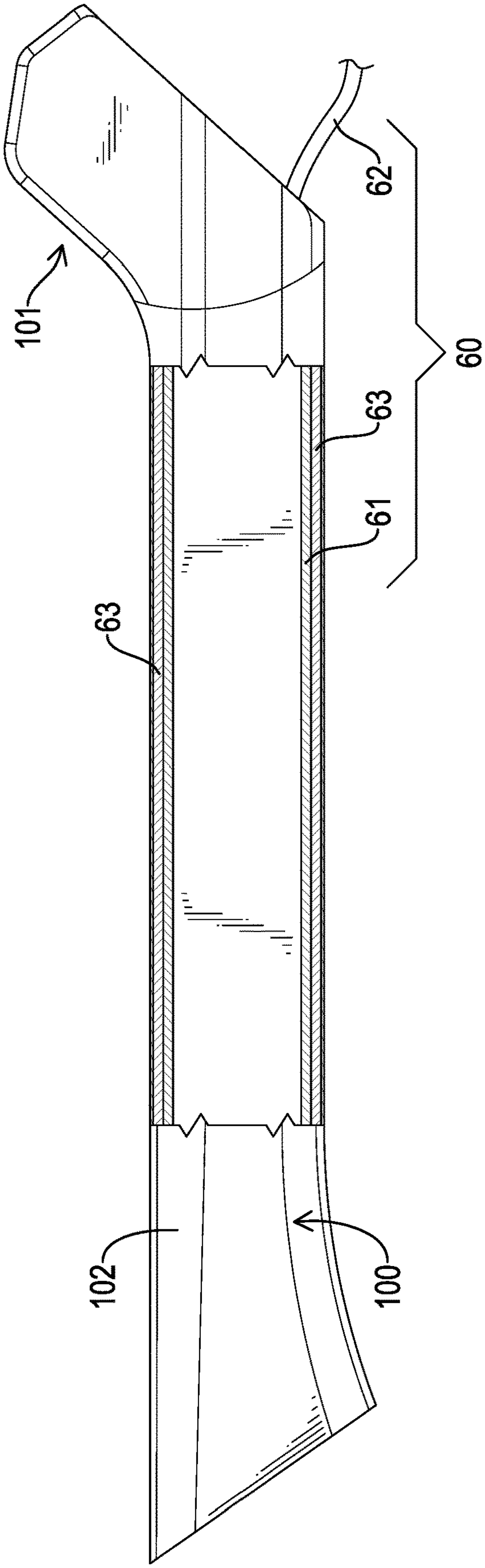
FIGS. 10 and 11 show different types of supporting units for a supporting unit deploying step of the manufacturing method in FIG. 9.
Figure 11:
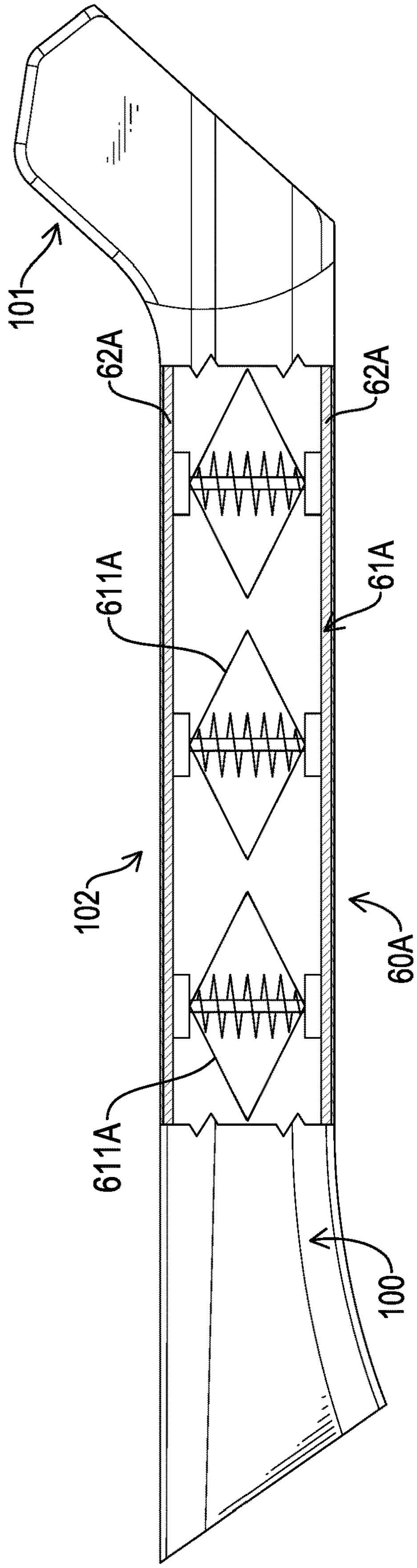
Figure 12:
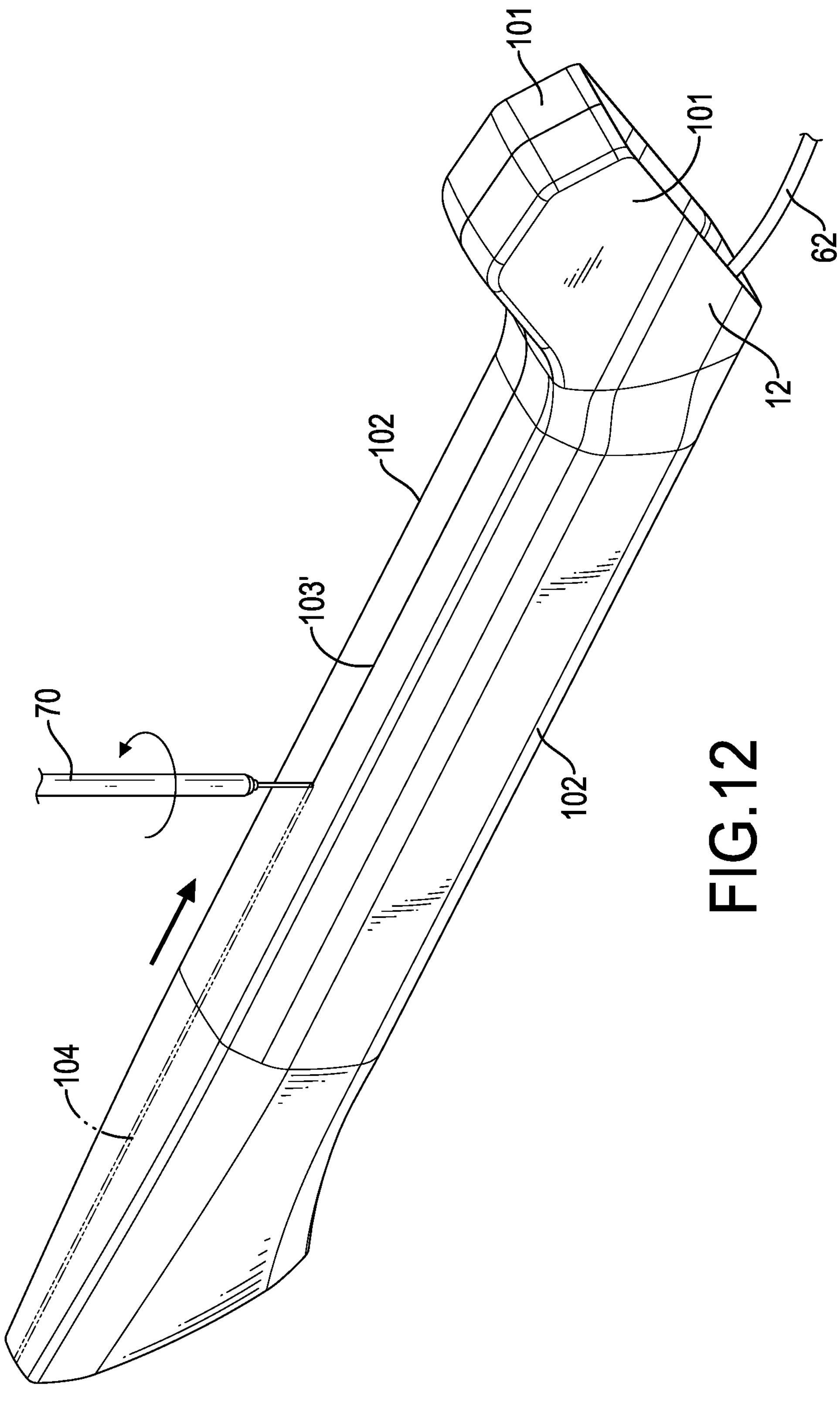
FIG. 12 shows a type of connecting means for a connecting step of the manufacturing method in FIG. 9.

In the supporting unit deploying step S22: with reference to FIGS. 9 to 11, deploy a supporting unit 60, 60A between the downtube segments 102 of the two casing parts 100 before the connecting step S3. The supporting unit 60, 60A comprises a supporter 61, 61A that can be driven to expand or contract and is used to support from an inside of the two casing parts 100 in the connecting step S3. The supporting unit 60, 60A includes but is not limited to an air bag, a rigid liner, or a mechanical support assembly, and may be made of metal, foam, wax, etc. With reference to FIGS. 10 and 12, as an example, the supporter 61 of the supporting unit 60 is an air bag that is driven through a gas tube 62 by importing or exporting gas. The supporting unit 60 further comprises two heat insulation pads 63 disposed on two sides of the supporter 61 for abutting the abutting lines 103' and preventing heat transfer.

With reference to FIG. 11, as another example, the supporting unit 60A has the supporter 61A and two contact elements 62A disposed on two sides of the supporter 61A for abutting the abutting lines 103'. The supporter 61A is a mechanical supporting assembly and has multiple drivers 611A therein. The drivers 611A can work with pneumatic pressure, hydraulic pressure, or electric force. Specifically, the driver 611A may be a pneumatic cylinder, a hydraulic cylinder, or an electric cylinder so as to drive the supporter 61A to expand or contract. The supporting unit 60, 60A may extend across the motor mount segments 101 and the downtube segments 102 of the two casing parts 100. Orders of the supporting unit deploying step S22 and the abutting step S21 may be exchanged. That is, the supporting unit 60, 60A is first deployed and then the two casing parts 100 are abutted around the supporting unit 60, 60A, or the two casing parts 100 are abutted first and then the supporting unit 60, 60A is inserted thereinto.

Figure 13:
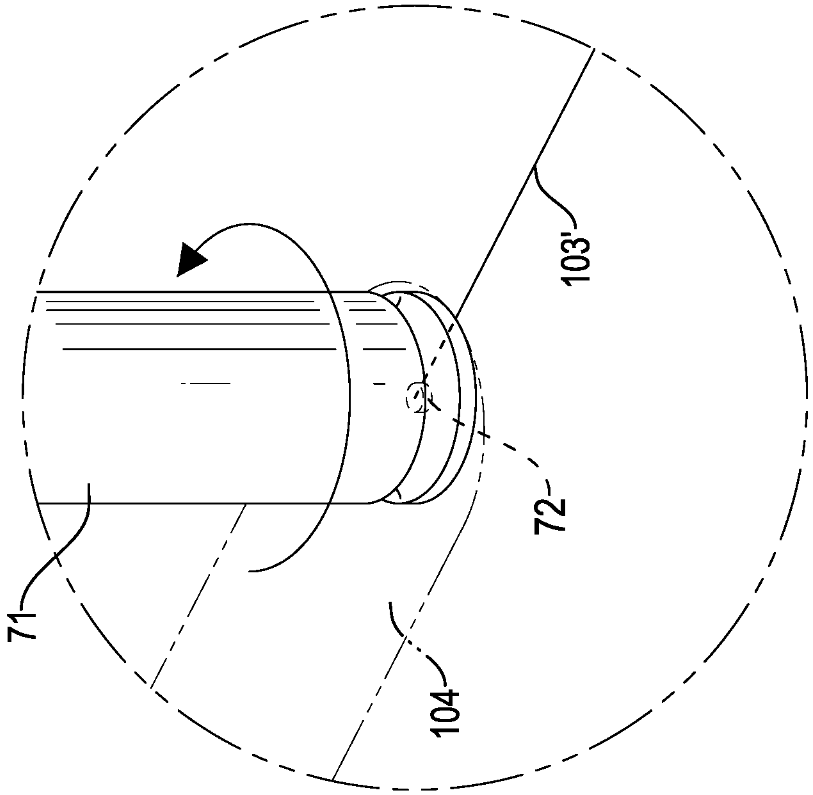
FIG. 13 is an enlarged view of connecting means for a connecting step of the manufacturing method in FIG. 12.

In the connecting step S3, with reference to FIGS. 9, 12, and 13, connect the two casing parts 100 along the abutting lines 103' via welding, wherein the supporting unit 60, 60A supports parts of the two casing parts 100 near the abutting lines 103'. In detail, parts of the two casing parts 100 near the abutting lines 103' are welded to form a connecting area 104. Parts of the motor mount segments 101 of the two casing parts 100 near the downtube segments 102 thereby form said front portion 11 of the motor mount prestructure 10. Parts of the motor mount segments 101 near tops of the two casing parts 100 thereby form said top portion 13 of the motor mount prestructure 10, so forth and so on. Briefly, after welding, the two casing parts 100 form the above-mentioned prestructure of a bicycle frame.

Filler-free welding is preferable. As a definition, filler-free welding is performed without adding exterior filler metals, and connects two objects by melting or plastically deforming the two objects. With reference to FIGS. 12 and 13, as an example, said filler-free welding may be friction stir welding, which uses a tool 70 having a main portion 71 and a pin 72. The pin 72 is located on a bottom of the main portion 71. The main portion 71 rotates and produces friction on the two casing parts 100, the parts near the abutting lines 103' gets heated and plastically deformed, and the pin 72 stirs the parts to connect the two casing parts 103'. Preferably, parts of the casing parts 100 near the connecting edges 103 may be formed as a thickened area reserved for plastic transformation. Through friction stir welding, surfaces of the motor mount prestructure 10 and the downtube portion 20 of the prestructure of a bicycle frame are smooth, and grinding process after connecting can be saved. Also, metal vapors, melted metals, and high-voltage electricity do not exist during the process, so a safer and greener process is provided.

Figure 14:
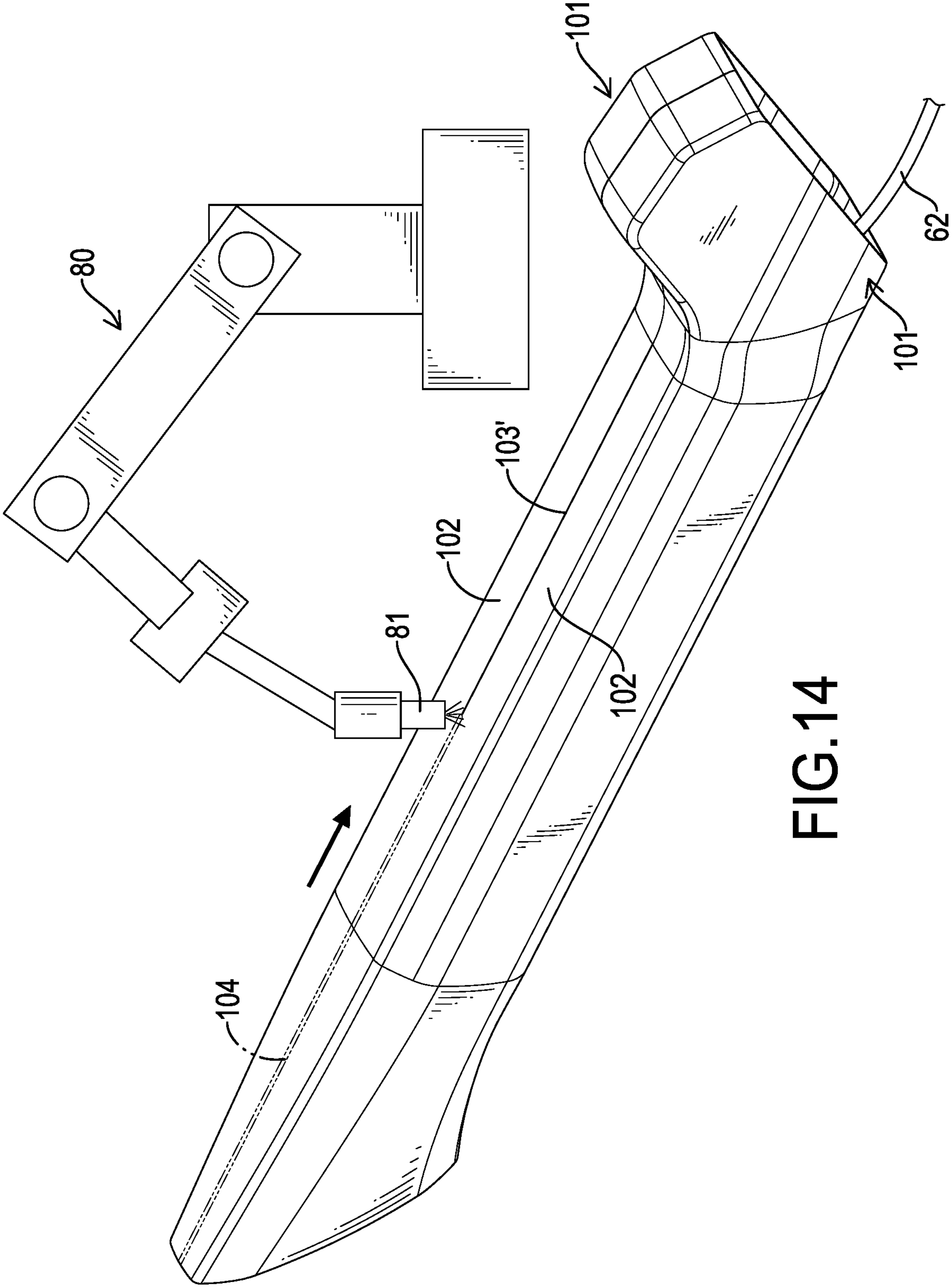
FIG. 14 shows another type of connecting means for a connecting step of the manufacturing method in FIG. 9.

Additionally, as another example, with reference to FIG. 14, said filler-free welding may comprise a robotic arm 80 having a welding tool 81, and the welding tool 81 may be chosen from laser welding and plasma welding for connecting the casing parts 100. The tool 70 of friction stir welding may be installed on the robotic arm 80 to achieve automatic welding processes and improve production efficiency as well.

Filler-free welding provides the following advantages:

1. During filler-free welding, parts of the two casing parts 100 get softened along the lines; the supporting unit 60, 60A prevents the casing parts 100 from inwardly deforming that may lead to defects of products.
2. The heat insulation pads 63 or the contact elements 62A prevent the melted or softened parts from infiltrating to the inside of the two casing parts 100 and forming redundant materials. Thereby, when a battery or wiring is inserted into an inner space of the downtube portion 20, or a motor system is mounted to the motor mount formed by the motor mount prestructure 10, the battery, wiring or the motor system can be easily installed instead of being blocked or engaged by redundant materials. Highly time-consuming work of removing redundant material can also be saved.
3. Said filler-free welding can be automatically performed, saving labor and improving production efficiency.

In the supporting unit removal step S42: remove the supporting unit 60, 60A from the two casing parts 100 after the connecting step S3. If the supporting unit 60, 60A is removed right after the connecting step S3, the prestructure of a bicycle frame is completed. Orders of the supporting unit removal step S42 and the motor mount forming step S41 may be exchanged when needed.

Figure 15A:
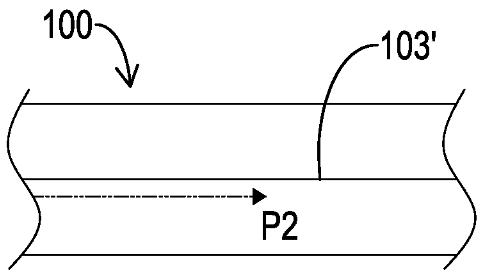
FIGS. 15A, 15B, and 15C show different types of welding route for a connecting step of the manufacturing method in FIG. 9.
Figure 15B:
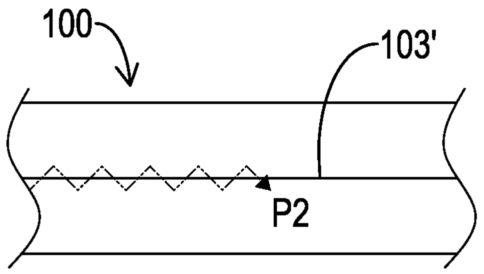
Figure 15C:
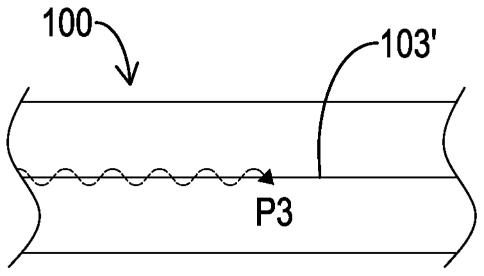

In addition, by the welding techniques, the two casing parts 100 could be pre-processed by CNC cutting or laser cutting to form symmetrical pattern along the lines as shown in FIGS. 15B and 15C. Therefore the abutting lines extend longer and the connected portions become stronger with the patterns. Then with reference to FIGS. 15A, 15B, and 15C, the tool 70 of friction stir welding or the welding tool 81 of laser welding or plasma welding can track different routes P1, P2, P3 along the abutting lines 103' for welding the two casing parts 100. For example, in FIG. 15A, the route P1 is linear. In FIG. 15B, the route P2 is jagged. In FIG. 15C, the route P3 is sinusoidal and wavelike or rectangular (not shown in the figure).

Figure 16:
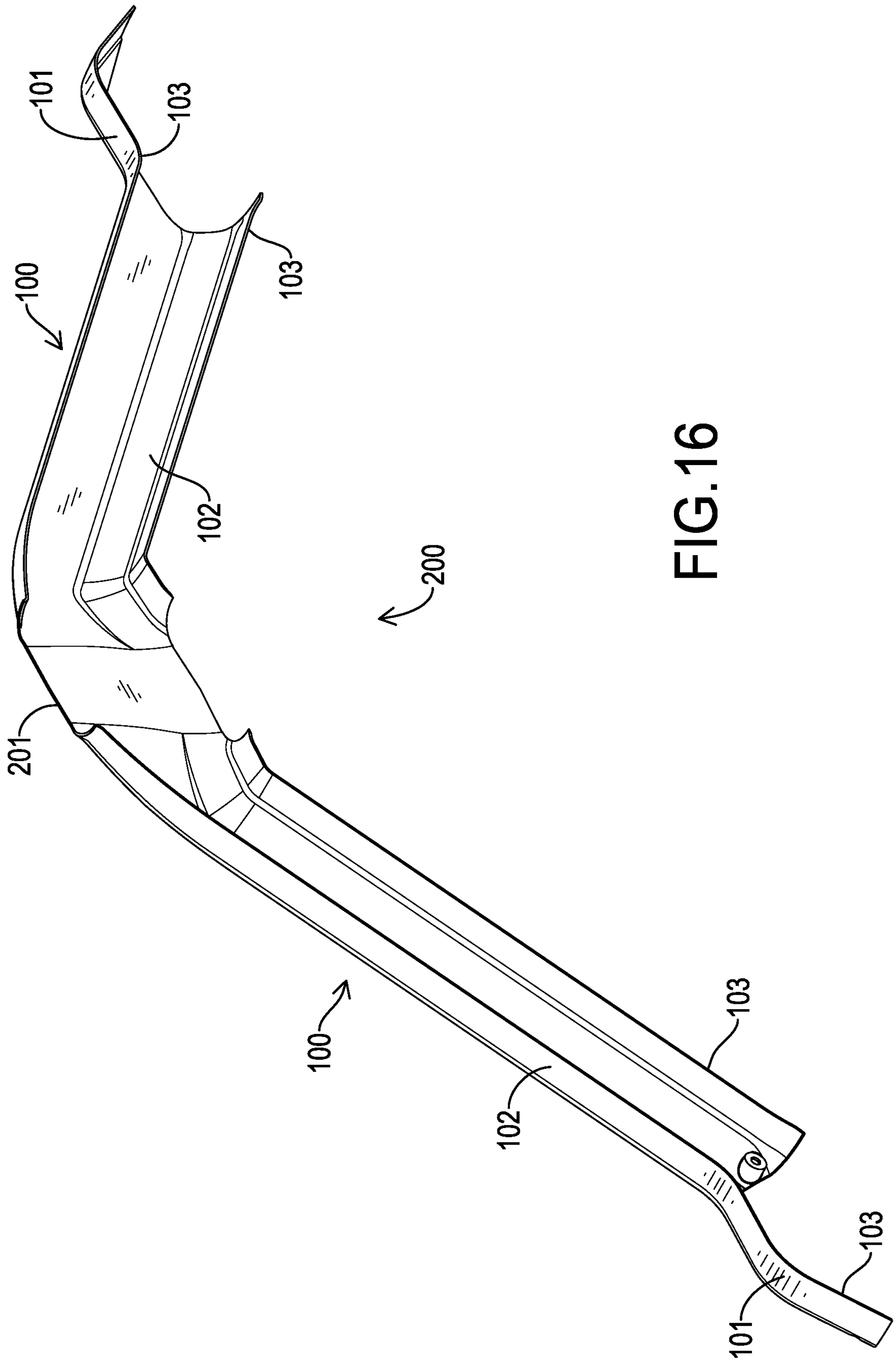
FIGS. 16 to 18 show processes of a third embodiment of a manufacturing method of a bicycle frame unit in accordance with the present invention.
Figure 17:
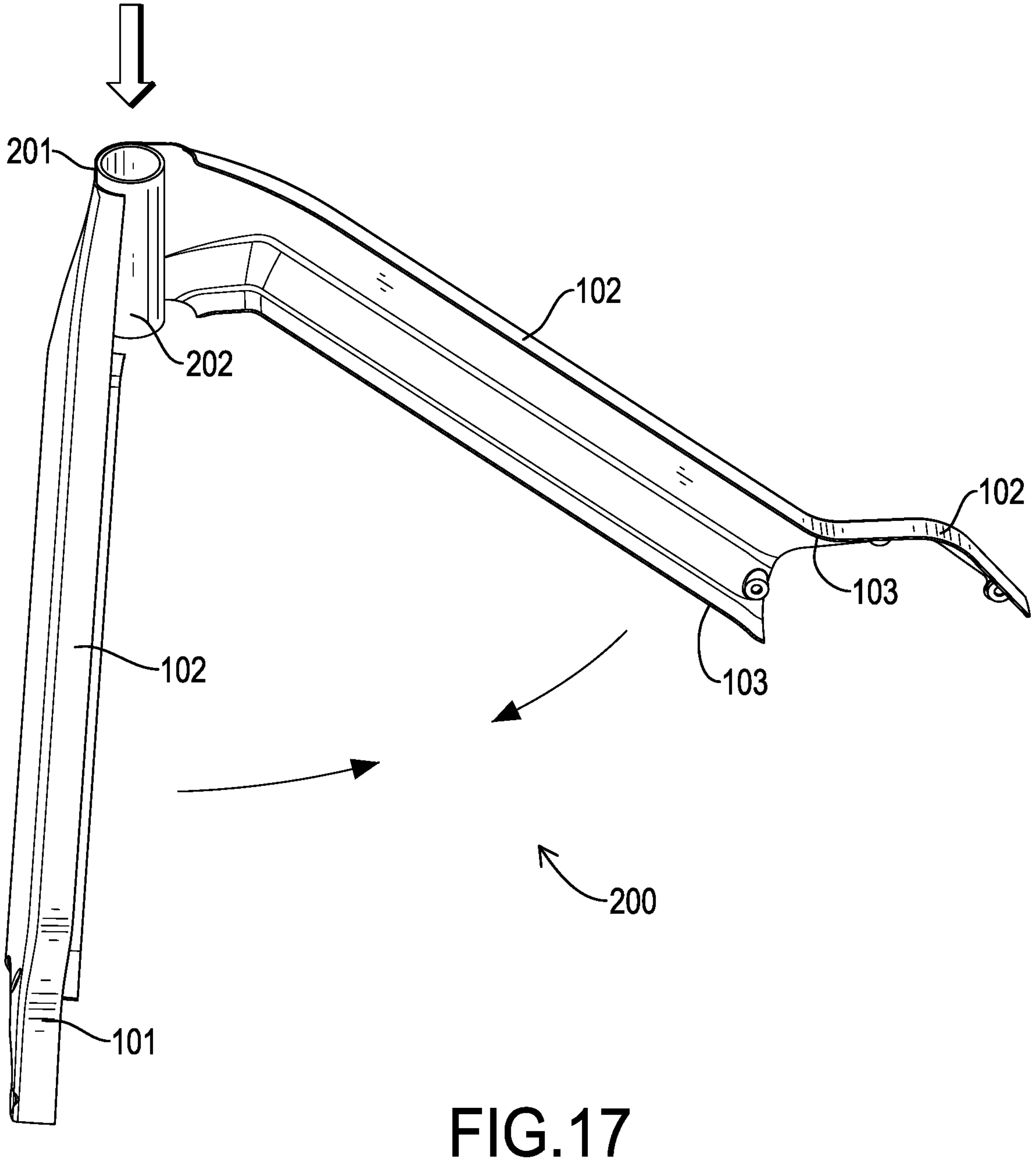
Figure 18:
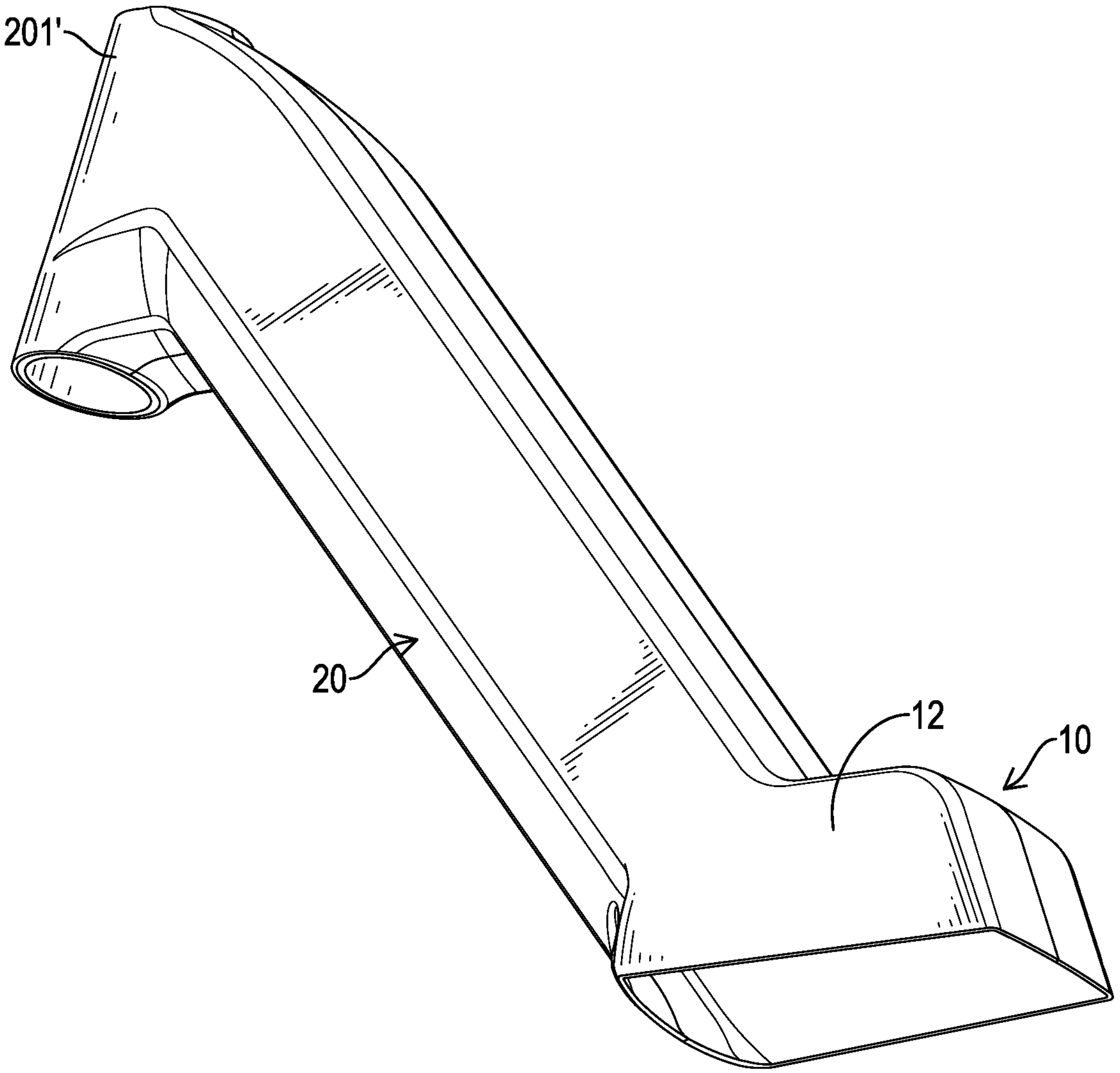

With reference to FIGS. 16 to 18, a third embodiment of the manufacturing method of a bicycle frame unit in accordance with the present invention has the following differences from the aforementioned embodiments.

In the pressing step S1: with reference to FIG. 16, press one said metal sheet to form a one-piece shell 200, wherein the shell 200 has the two casing parts 100 and a head tube part 201 connected between the downtube segments 102 of the two casing parts 100, and the motor mount segment 101 of each one of the two casing parts 100 is connected to the corresponding downtube segment 102 away from the head tube part 201. The connecting edges 103 extend from the motor mount segment 101 to the downtube segment 102.

In the abutting step S21: with reference to FIGS. 17 and 18, attach a lined tube 202 to the head tube part 201, and fold the shell 200 about the head tube part 201 to abut the connecting edges 103 of the two casing parts 100 for the following connecting step S3 to connect the two casing parts 100 and form the head tube part 201 and the two casing parts 100 into a head tube portion 201', the downtube portion 20, and the motor mount prestructure 10.

Precision in shapes and sizes can be further improved by the third embodiment of the present invention, since the motor mount segments 101, the downtube segments 102, and the head tube part 201 are formed in one-piece.

Figure 19A:
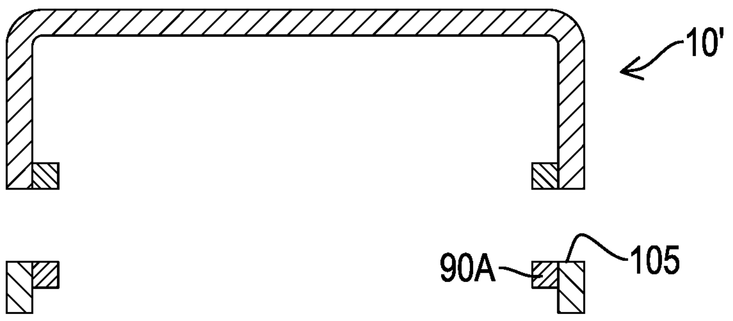
FIGS. 19A and 19B show a further step of the third embodiment of the manufacturing method in FIG. 16.
Figure 19B:

If the first width W1 of the motor mount prestructure 10 is greater, the motor mount prestructure 10 should be adaptable for more motor systems. In this case, if the corresponding motor system has a small width, a width adaptor will be necessary to provide a narrower mounting space. With reference to FIGS. 19A and 19B, after the motor mount forming step S41, a width adaptor 90A, 90B may be fixed to the motor mount 10' near bores 105 (i.e. mounting points). By deploying the width adaptor 90A, 90B, different types of the motor systems can be stably screwed to the motor mount 10'.

As an example, with reference to FIG. 19A, the width adaptor 90A is mounted on an interior of the motor mount 10' by gluing, welding with fillers, non-filler welding, etc. As another example, with reference to FIG. 19B, the width adaptor 90B may be produced by the following steps: inserting a tube into said bore 105 to narrow an inner width of the motor mount 10', connecting the tube with the bore 105 by gluing, welding with fillers, non-filler welding, etc., and removing a portion of said tube by cutting and/or grinding. The rest portion of the tube is thereby formed as the width adaptor 90B.

With reference to FIG. 5, bicycle frame units in accordance with the present invention are manufactured by the aforementioned manufacturing method. Furthermore, each one of the motor systems 30', 30", 30'" has a transmission shaft being coincident with the reference axis of the motor mount 10', 10", 10'", so the cut edges 122', 122", 122'" on the two side plates 12 are located above the reference axis.

In practice, the motor mount prestructure 10 of the prestructure of a bicycle frame is adaptable to various existing motor systems. Additionally, the motor mount 10', 10", 10'" may have a variety of shapes, for instance, an inverted U-shape, an L-shape, etc. In one embodiment, the motor mount prestructure 10 could be formed by pressing a wider metal sheet or other possible techniques to form inverted U-shape or the like.

With reference to FIGS. 20 to 24, taking the Type III bicycle frame unit for example, the bicycle frame unit only comprises the motor mount 10'" and the downtube portion 20. Other components are attached to the bicycle frame unit afterwards, so the bicycle frame unit can be used to make different types of bicycles. An opposite end of the downtube portion 20 from the motor mount 10'" is connected to a head tube, and the top portion of the motor mount 10'" is connected with a seat tube. With reference to FIGS. 20 to 23, the rear portion of the motor mount 10'" is connected to chain stays, and the chain stays are connected to the seat tube through seat stays. With reference to FIGS. 21 to 24, the seat tube is connected to the downtube portion 20 through a top tube. As variables of the conventional bicycle frame structures, detailed descriptions are omitted.

Figure 20:
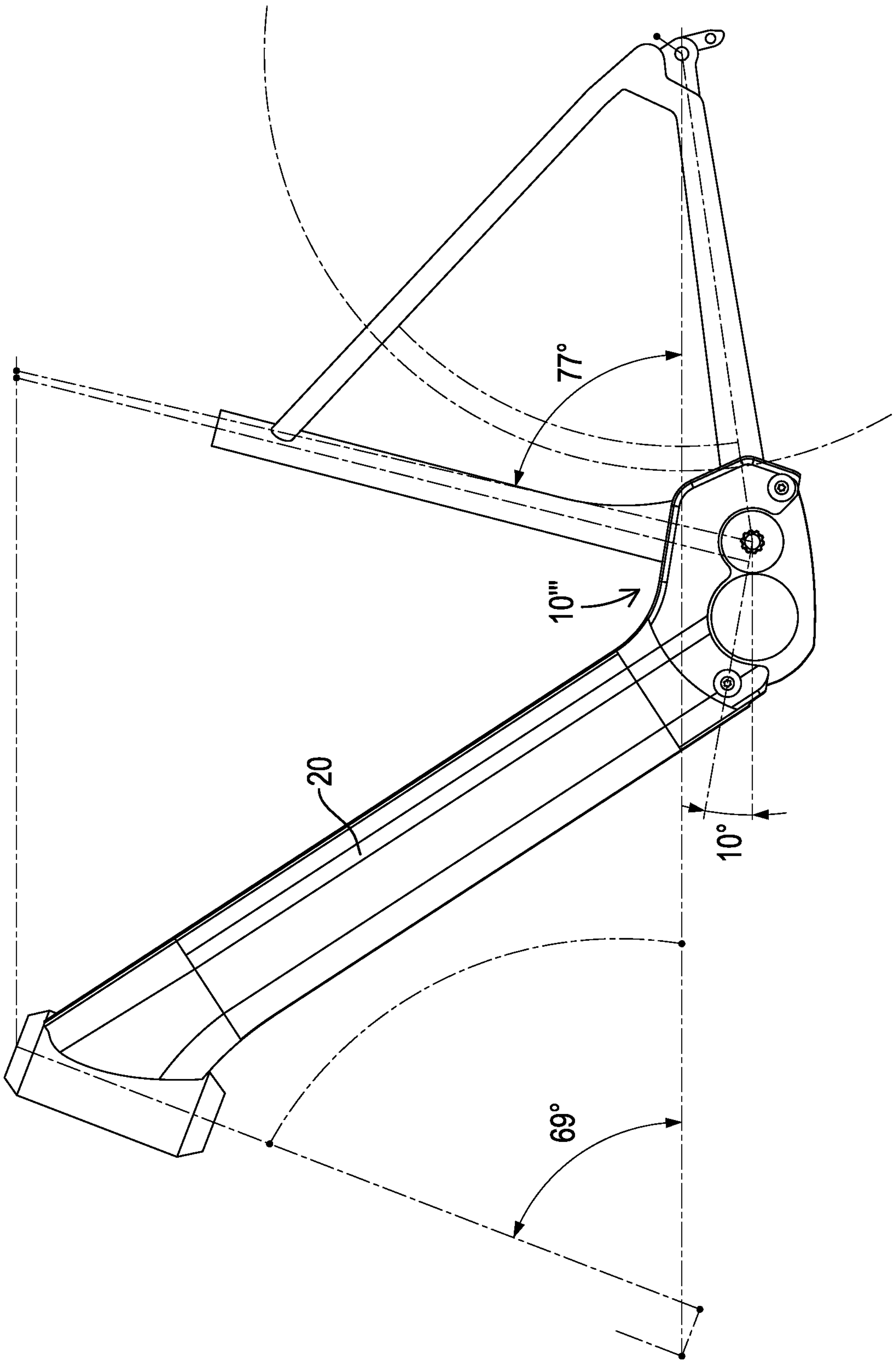
FIGS. 20 to 24 show a bicycle frame unit made by a manufacturing method of a bicycle frame unit in accordance with the present invention used for different types of bicycles.
Figure 21:
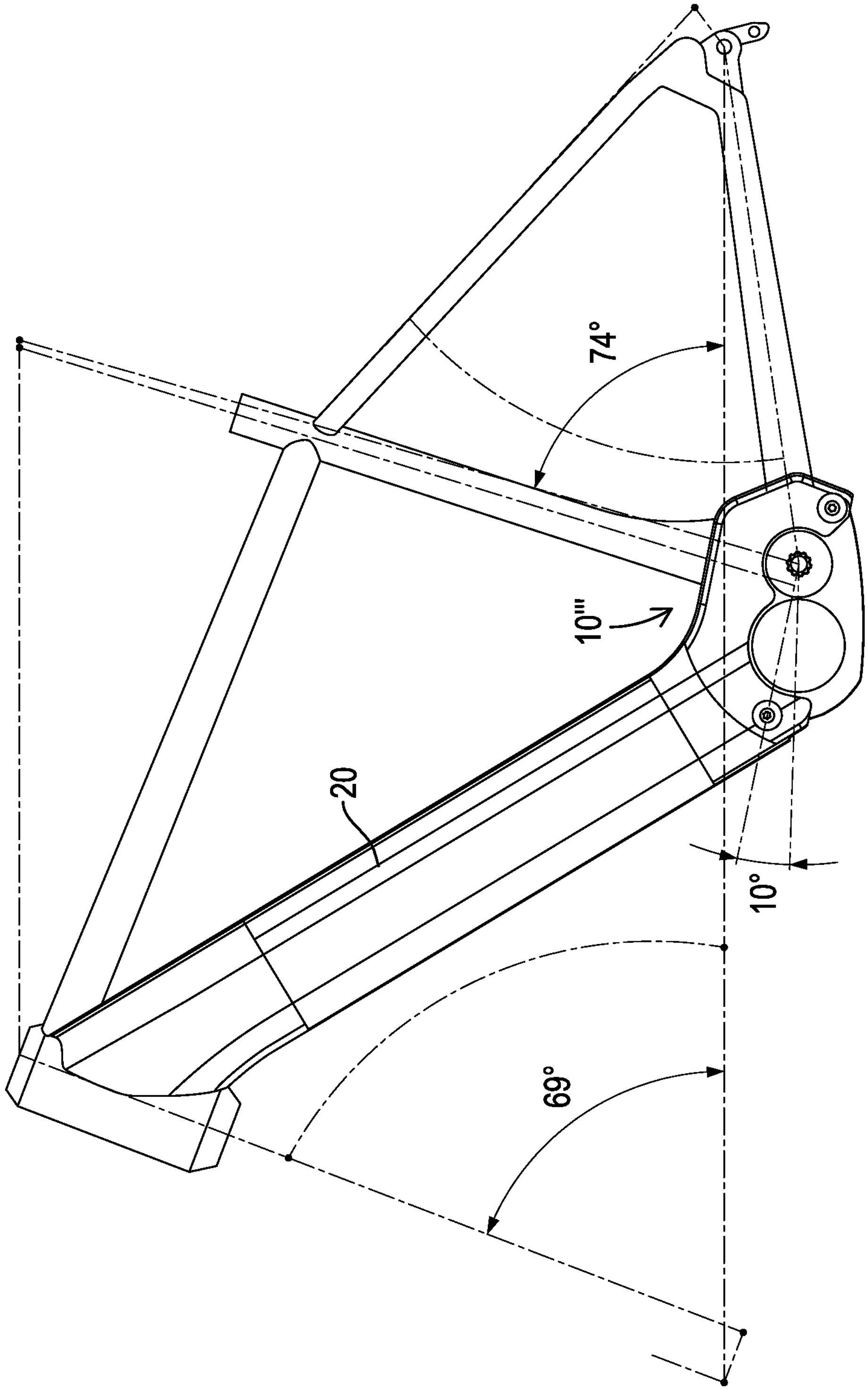
Figure 22:
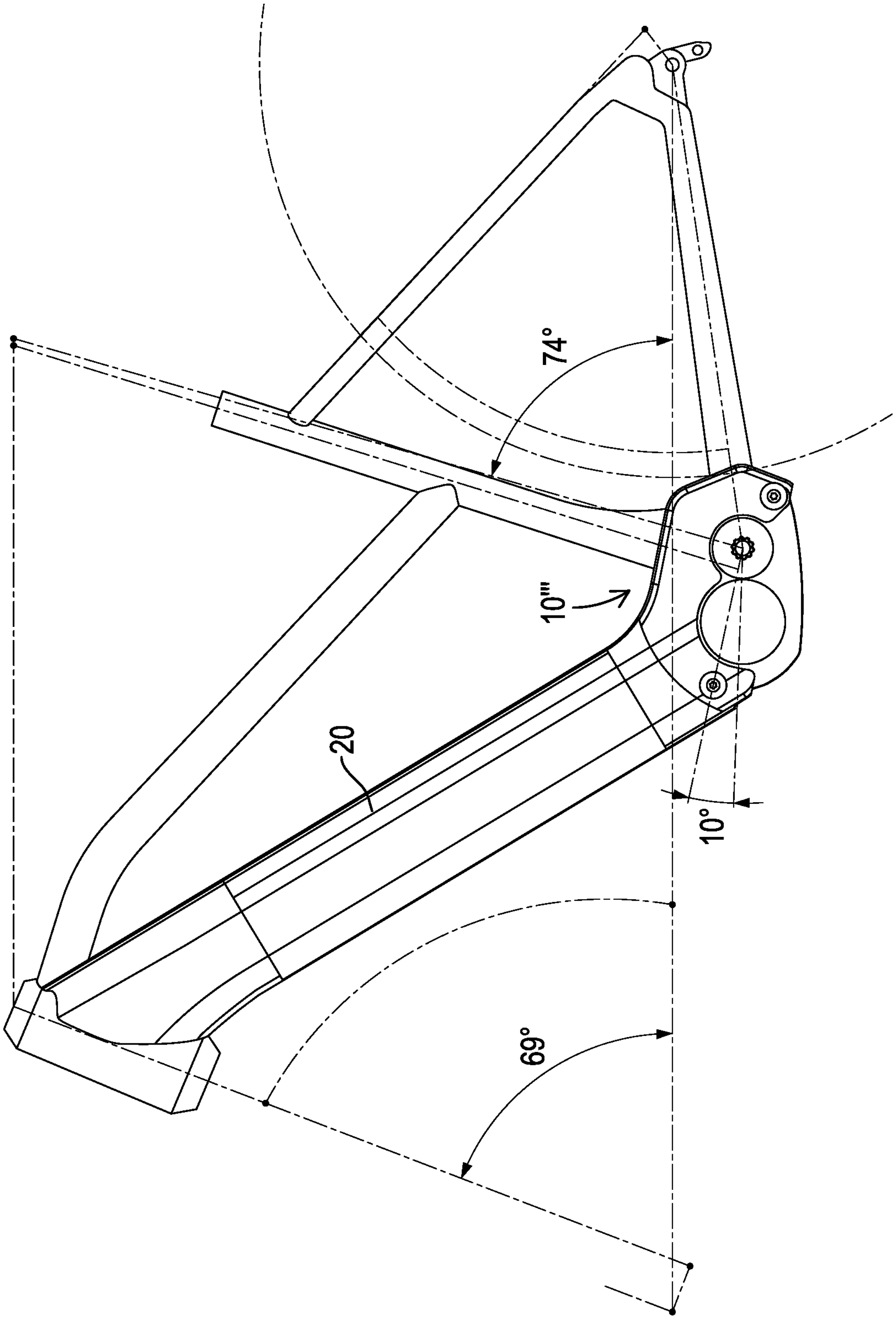
Figure 23:
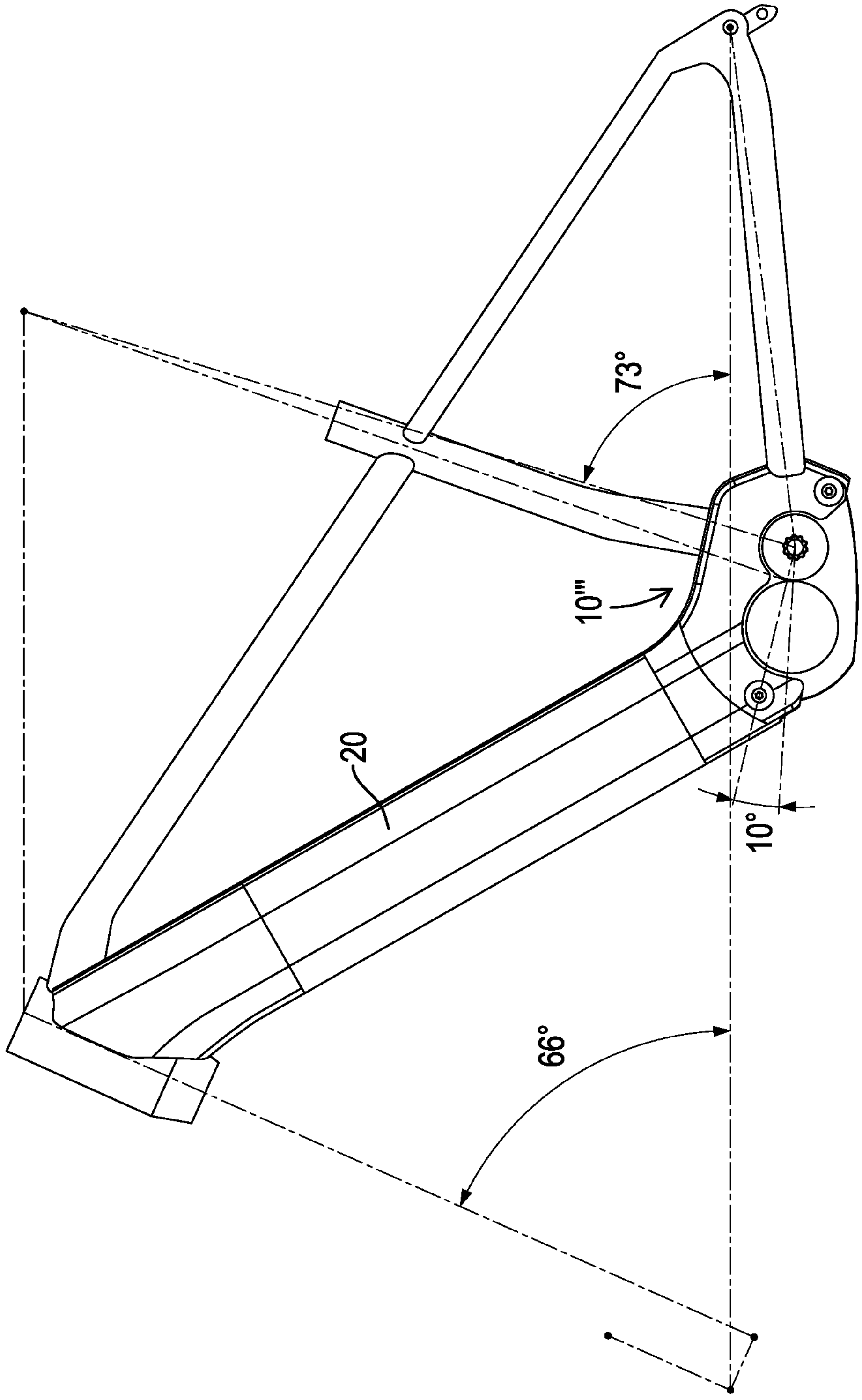
Figure 24:
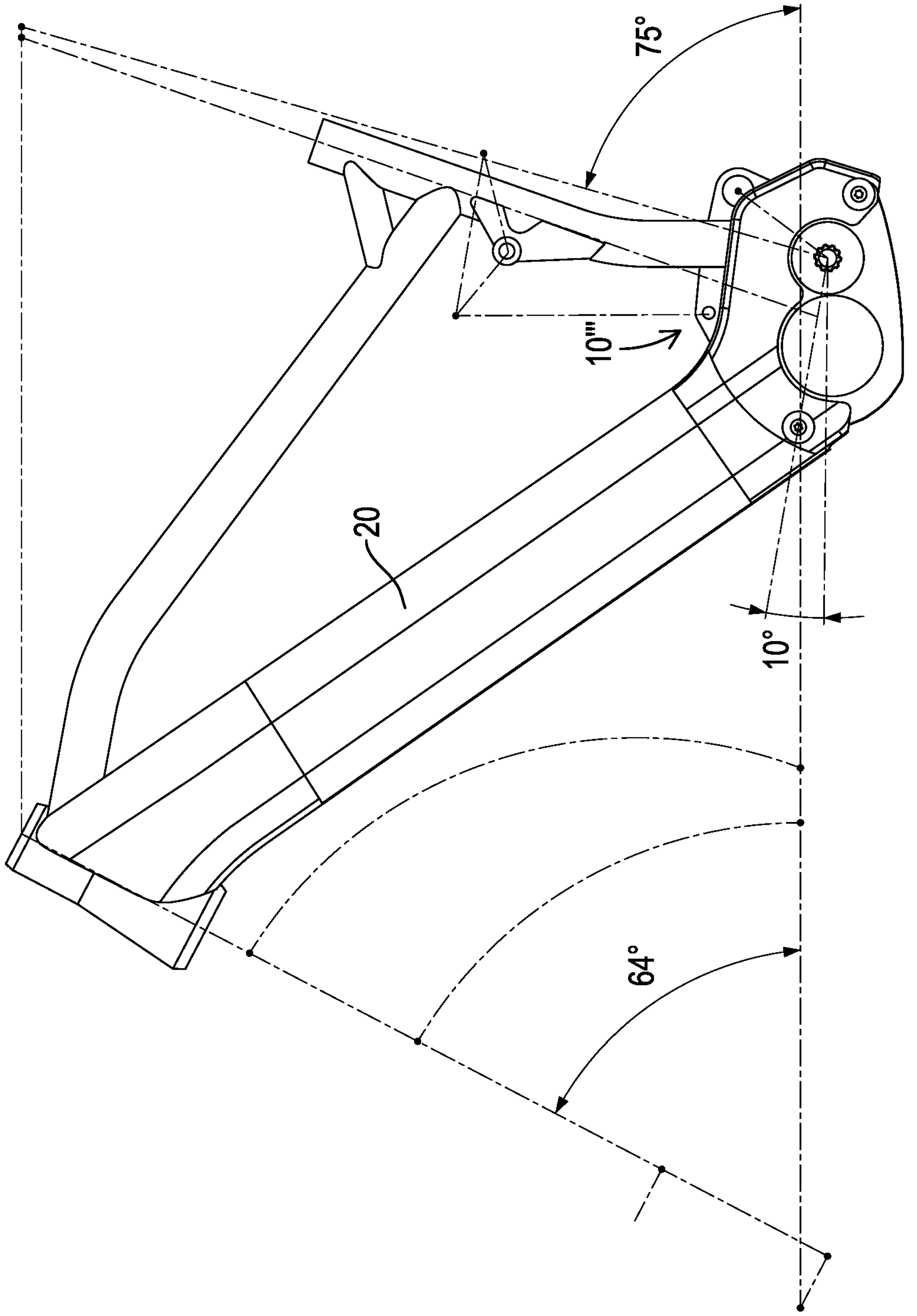

With reference to FIG. 20, an inclined angle between the head tube and the horizon is 69 degrees, and that between the seat tube and the horizon is 77 degrees. With reference to FIG. 21, an inclined angle between the head tube and the horizon is 69 degrees, and that between the seat tube and the horizon is 74 degrees. With reference to FIG. 22, an inclined angle between the head tube and the horizon is 69 degrees, that between the seat tube and the horizon is 74 degrees, but a configuration of the top tube is different from that of FIG. 21. With reference to FIG. 23, an inclined angle between the head tube and the horizon is 66 degrees, and that between the seat tube and the horizon is 73 degrees. With reference to FIG. 24, an inclined angle between the head tube and the horizon is 64 degrees, and that between the seat tube and the horizon is 75 degrees.

If the motor mount prestructure 10 is cut and bored based on a bicycle type having the smallest inclined angle of the head tube, the motor mount 10'" can be used to make other bicycle types by simply turning the bicycle frame unit to a correct angle, and complies with the bicycle-frame-related standards.

Figure 25:
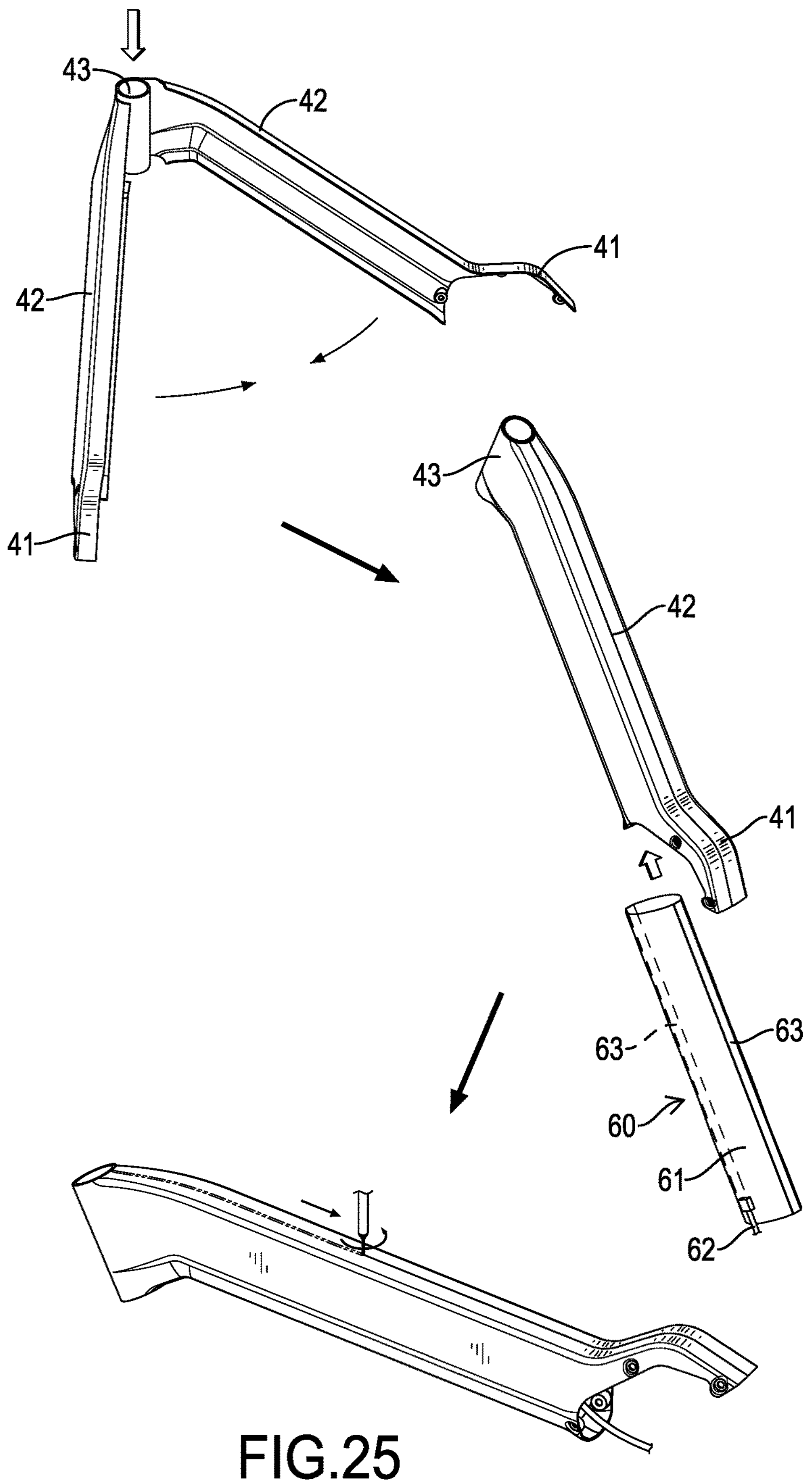
FIGS. 25 and 26 show another manufacturing method of a bicycle frame unit of the present invention.
Figure 26:
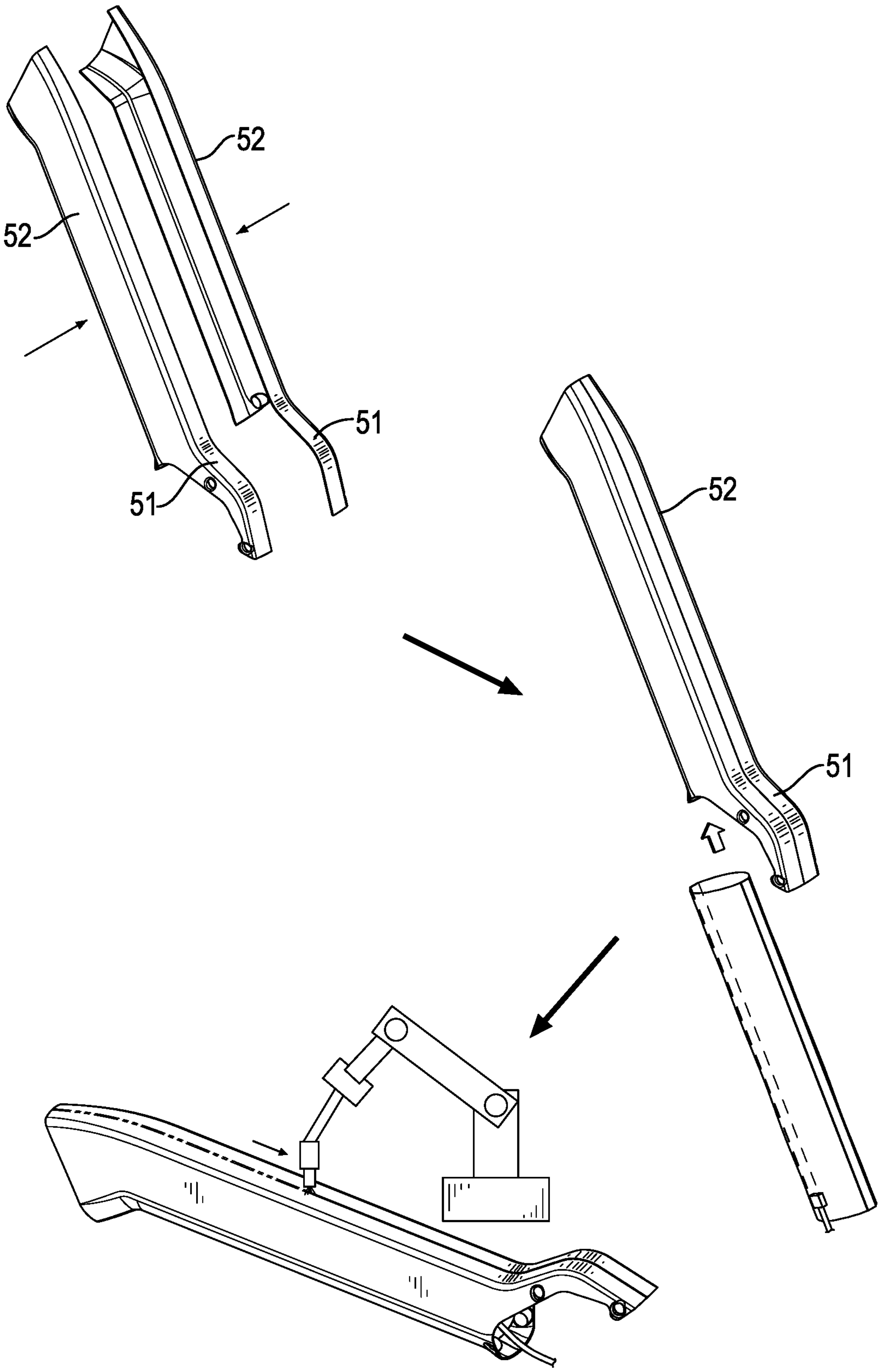

With reference to FIGS. 25 and 26, the present invention further provides other manufacturing methods of a bicycle frame unit, whose pressing step is pressing metal sheet(s) into the casing parts with motor mount portions 41, 51 corresponding to a specific motor system. By using filler-free welding in the connecting step, theses manufacturing methods also have the previously listed technical advantages in making bicycle frame units.

With reference to FIG. 25, in the pressing step one said metal sheet is pressed into a shell having two motor mount portions 41, two downtube portions 42, and a head tube portion 43 connected as a one-piece. After connecting, the two motor mount portions 41 are formed as a motor mount for the corresponding motor system. Fixing points for motor systems may be disposed before the connecting step. Details in this manufacturing method complies with the one shown in FIGS. 10, 11, 12, 16 to 18 and corresponding descriptions.

With reference to FIG. 26, the pressing step pressing two said metal sheets into two one-piece casing parts, each having a motor mount portion 51 and a downtube portion 52. Details in this manufacturing method comply with hose shown in FIGS. 7 to 14 and corresponding descriptions.

What is claimed is:

1. A manufacturing method of a bicycle frame unit, and the manufacturing method comprising: a pressing step: pressing one or more metal sheets to form two casing parts that are overlappable, wherein each one of the two casing parts has a motor mount segment and a connecting edge, the motor mount segment has a side plate, and the connecting edge matches with the connecting edge of the other casing part; an abutting step: abutting the connecting edges of the two casing parts to form an abutting line; a connecting step: connecting the two casing parts along the abutting line such that the motor mount segments of the two casing parts are connected and form a motor mount prestructure being suitable for multiple types of motor systems, and having the two side plates of the motor mount segments, a front portion, a top portion connected with the front portion and between the two side plates, and a motor-installation space formed between the two side plates and the top portion, wherein the two side plates are flat, each one of the two said side plates has a bottom edge, and the bottom edge of each of the two side plates is located below a reference axis; and a motor mount forming step: after a specific motor system is determined, cutting the two side plates of the motor mount prestructure and forming cut edges in compliance with the specific motor system so as to form a bicycle frame unit with a motor mount, wherein the cut edges are located above the reference axis, and a transmission shaft of the specific motor system is substantially along the reference axis when the specific motor system is mounted with the motor mount.

2. The manufacturing method as claimed in claim 1, wherein the manufacturing method comprises a supporting unit deploying step: deploying a supporting unit between the two casing parts before the connecting step; and a supporting unit removal step: removing the supporting unit from the two casing parts after the connecting step; and in the connecting step, connecting the two casing parts along the abutting line via filler-free welding, wherein the supporting unit supports parts of the two casing parts near the abutting line.

3. The manufacturing method as claimed in claim 1, wherein in the motor mount forming step, cutting the two side plates by laser cutting.

4. The manufacturing method as claimed in claim 3, wherein the manufacturing method comprises a supporting unit deploying step: deploying a supporting unit between the two casing parts before the connecting step; and a supporting unit removal step: removing the supporting unit from the two casing parts after the connecting step; and in the connecting step, connecting the two casing parts along the abutting line via filler-free welding, wherein the supporting unit supports parts of the two casing parts near the abutting line.

5. The manufacturing method as claimed in claim 1, wherein in the pressing step, forming each one of the two casing parts to have a downtube segment connected to the motor mount segment in one-piece; and in the connecting step, connecting the downtube segments of the two casing parts as a downtube portion which is connected with the front portion of the motor mount prestructure.

6. The manufacturing method as claimed in claim 5, wherein the manufacturing method comprises a supporting unit deploying step: deploying a supporting unit between the two casing parts before the connecting step; and a supporting unit removal step: removing the supporting unit from the two casing parts after the connecting step; and in the connecting step, connecting the two casing parts along the abutting line via filler-free welding, wherein the supporting unit supports parts of the two casing parts near the abutting line.

7. The manufacturing method as claimed in claim 5, wherein in the motor mount forming step, cutting the two side plates by laser cutting.

8. The manufacturing method as claimed in claim 7, wherein the manufacturing method comprises a supporting unit deploying step: deploying a supporting unit between the two casing parts before the connecting step; and a supporting unit removal step: removing the supporting unit from the two casing parts after the connecting step; and in the connecting step, connecting the two casing parts along the abutting line via filler-free welding, wherein the supporting unit supports parts of the two casing parts near the abutting line.

9. The manufacturing method as claimed in claim 5, wherein in the pressing step, pressing one said metal sheet to form a shell being one-piece, wherein the shell having the two casing parts and a head tube part connected between the downtube segments of the two casing parts, and the motor mount segment of each one of the two casing parts is connected to the corresponding downtube segment away from the head tube part; and in the abutting step, folding the shell about the head tube part to abut the two casing parts for the following connecting step.

10. The manufacturing method as claimed in claim 9, wherein the manufacturing method comprises a supporting unit deploying step: deploying a supporting unit between the two casing parts before the connecting step; and a supporting unit removal step: removing the supporting unit from the two casing parts after the connecting step; and in the connecting step, connecting the two casing parts along the abutting line via filler-free welding, wherein the supporting unit supports parts of the two casing parts near the abutting line.

11. The manufacturing method as claimed in claim 9, wherein in the motor mount forming step, cutting the two side plates by laser cutting.

12. The manufacturing method as claimed in claim 11, wherein the manufacturing method comprises a supporting unit deploying step: deploying a supporting unit between the two casing parts before the connecting step; and a supporting unit removal step: removing the supporting unit from the two casing parts after the connecting step; and in the connecting step, connecting the two casing parts along the abutting line via filler-free welding, wherein the supporting unit supports parts of the two casing parts near the abutting line.

* * * * *